(12) United States Patent
Krishnan et al.

(10) Patent No.: US 10,651,522 B2
(45) Date of Patent: May 12, 2020

(54) HYBRID ELECTROCHEMICAL CELL SYSTEMS AND METHODS OF OPERATION

(71) Applicant: NANTENERGY, INC., Scottsdale, AZ (US)

(72) Inventors: Ramkumar Krishnan, Scottsdale, AZ (US); Mark Naden, Oro Valley, AZ (US); Jonathan Goldberg, Chandler, AZ (US); Joel Hayes, Chandler, AZ (US); Todd Trimble, Phoenix, AZ (US)

(73) Assignee: NANTENERGY, INC., Scottsdale, AZ (US)

( * ) Notice: Subject to any disclaimer, the term of this patent is extended or adjusted under 35 U.S.C. 154(b) by 55 days.

(21) Appl. No.: 15/579,408

(22) PCT Filed: Jun. 6, 2016

(86) PCT No.: PCT/US2016/036026
§ 371 (c)(1),
(2) Date: Dec. 4, 2017

(87) PCT Pub. No.: WO2016/197109
PCT Pub. Date: Dec. 8, 2016

(65) Prior Publication Data
US 2018/0145383 A1 May 24, 2018

Related U.S. Application Data

(60) Provisional application No. 62/171,003, filed on Jun. 4, 2015.

(51) Int. Cl.
*H01M 12/08* (2006.01)
*H01M 10/04* (2006.01)
(Continued)

(52) U.S. Cl.
CPC ....... *H01M 12/08* (2013.01); *H01M 10/0413* (2013.01); *H01M 10/0445* (2013.01);
(Continued)

(58) Field of Classification Search
CPC ............. H01M 12/08; H01M 10/0445; H01M 10/4207
See application file for complete search history.

(56) References Cited

U.S. PATENT DOCUMENTS

| 3,532,548 A | 10/1970 | Stachurski | |
|---|---|---|---|
| 2005/0105229 A1* | 5/2005 | Deng | H02J 9/062 361/90 |
| 2011/0070506 A1* | 3/2011 | Friesen | H01M 8/04873 429/404 |

OTHER PUBLICATIONS

International Search Report PCT/US2016/036026 dated Sep. 29, 2016.
(Continued)

*Primary Examiner* — Jonathan G Jelsma
(74) *Attorney, Agent, or Firm* — Pillsbury Winthrop Shaw Pittman, LLP

(57) ABSTRACT

Disclosed is a hybrid electrochemical cell having two (or more) sub-cells each with different cell chemistry. For example, a second electrochemical sub-cell has a metal fuel electrode with the same type of metal fuel in a first electrochemical sub-cell, but has a different battery chemistry than the first sub-cell. A controller is configured to selectively generate an electrical current from at least one sub-cell in a discharge mode and selectively apply an electrical current to at least one sub cell in a charge mode, e.g., by controlling an open or closed state of switches. The operating modes may be controlled based on input parameters.

34 Claims, 18 Drawing Sheets

(51) Int. Cl.
  *H01M 10/42*   (2006.01)
  *H01M 10/30*   (2006.01)
  *H01M 10/48*   (2006.01)
  *H01M 10/34*   (2006.01)

(52) U.S. Cl.
  CPC ....... *H01M 10/30* (2013.01); *H01M 10/4207* (2013.01); *H01M 10/48* (2013.01); *H01M 10/34* (2013.01); *Y02E 60/128* (2013.01)

(56) References Cited

OTHER PUBLICATIONS

Written Opinion of the International Searching Authority PCT/US2016/036026 dated Sep. 29, 2016.
Written Opinion of the International Preliminary Examining Authority PCT/US2016/036026 dated May 9, 2017.
International Preliminary Report on Patentability dated Oct. 13, 2017 issued in corresponding International Patent Application No. PCT/US2016/036026 (28 pgs.).

\* cited by examiner

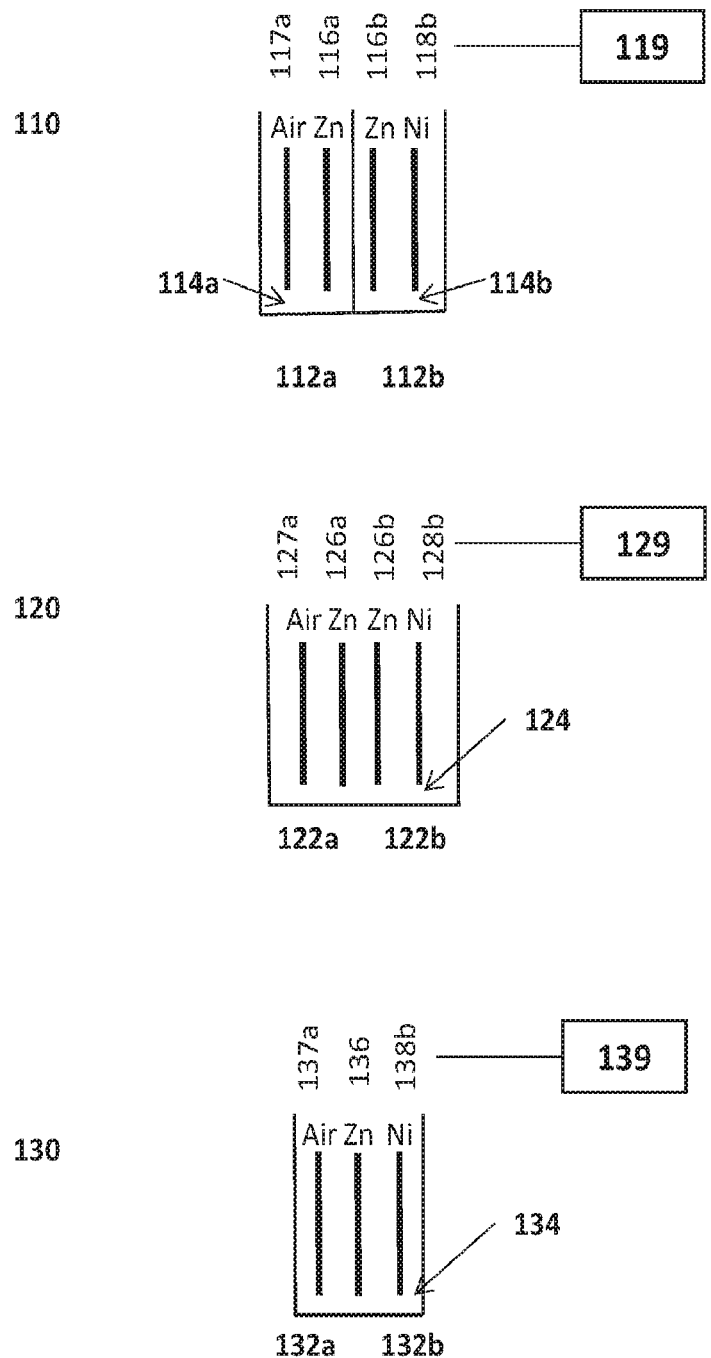

FIG. 2 – Series terminal configurations

Fuel electrode (e.g. Zn anode)
(coupled to air electrode/OEE and Ni electrode)

Switching configurations at singular +/-
terminals Baseline use of switches to connect
Ni electrode Switching confirgurations w/ multiple +/- terminals
Enables simultaneous/high power operation

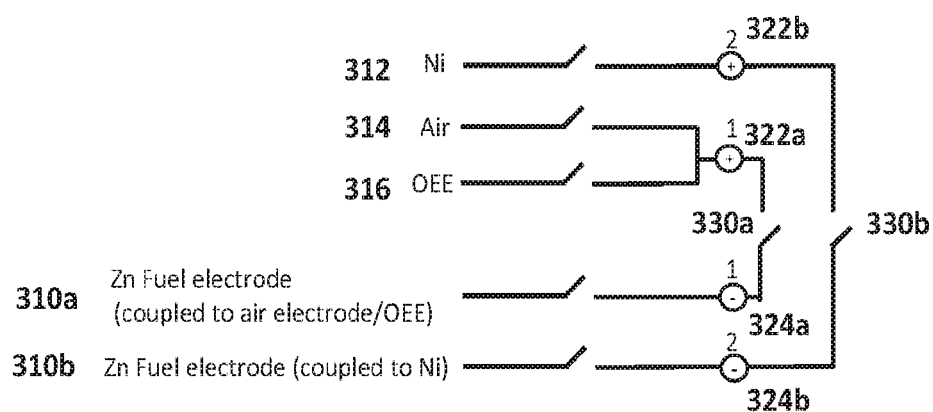
FIG. 3 – Parallel terminal configuration

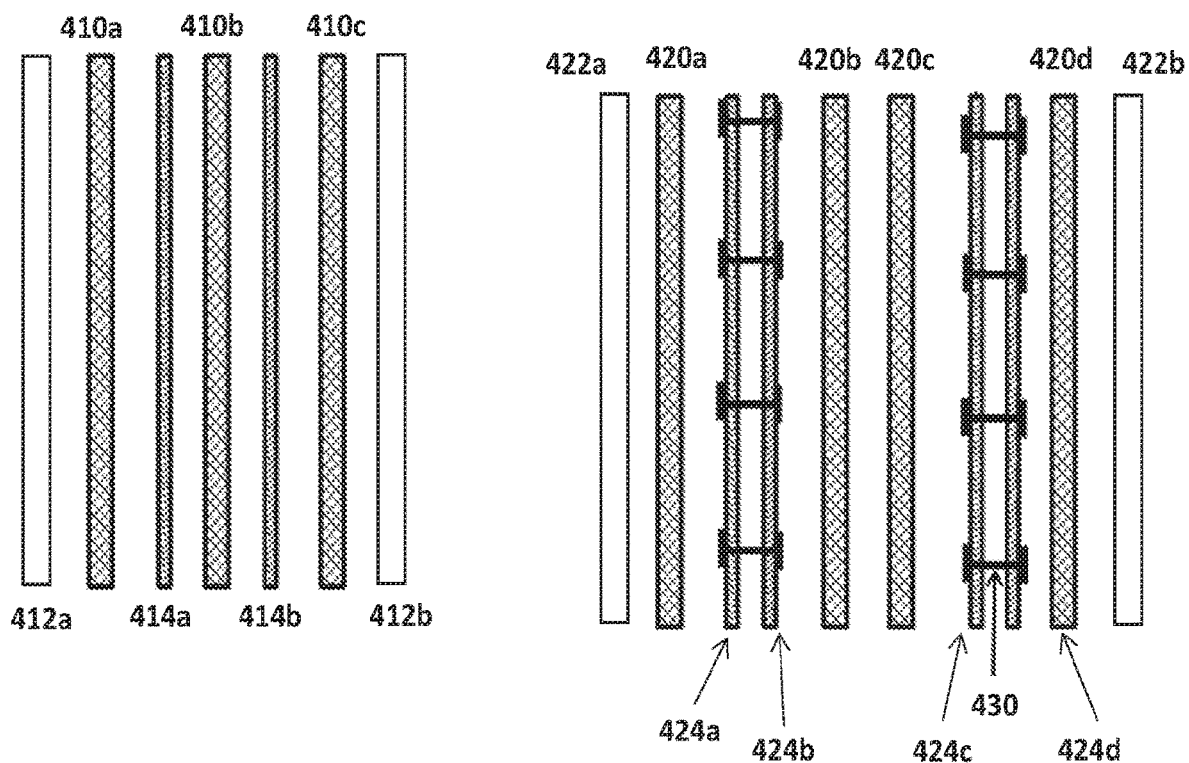

FIG. 7

SERIES-MODE, CELL LEVEL ARCHITECTURE
CONCEPT 1: Common Anode for Ni-Zn and Zn-Air Modes

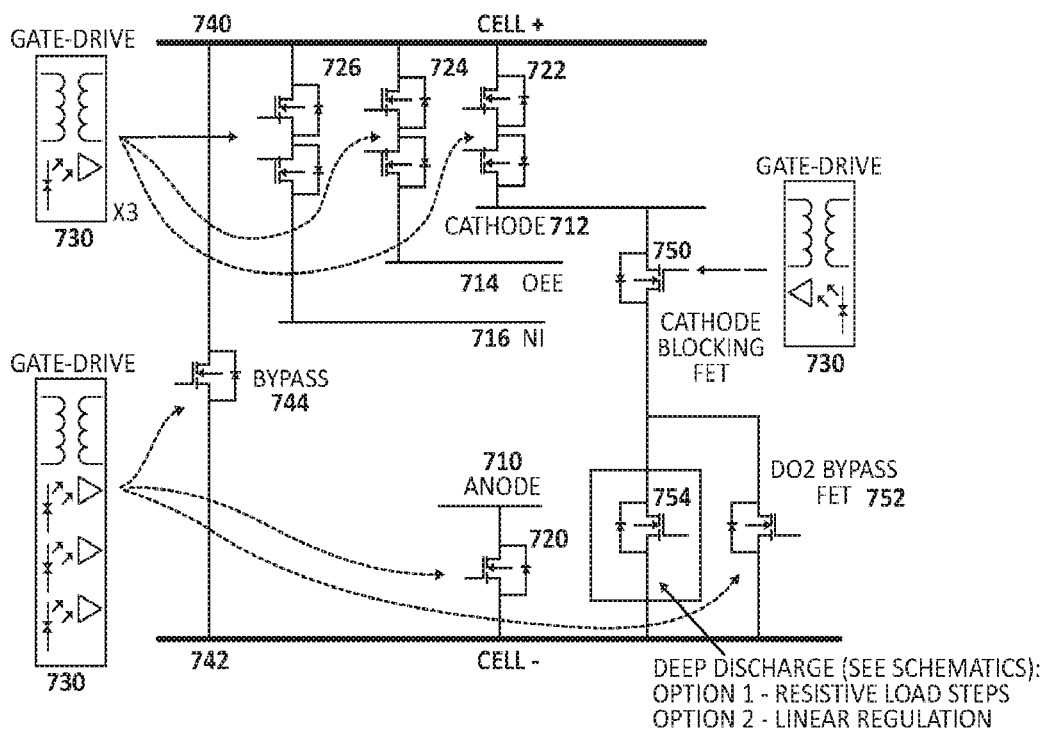

DEEP DISCHARGE (SEE SCHEMATICS):
OPTION 1 - RESISTIVE LOAD STEPS
OPTION 2 - LINEAR REGULATION

OPERATING MODES

Ni-Zn Charging:
1) Turn ON Ni and Anode FETs, Activate charger until electrodes are charged
2) All other FETs OFF Ni Top-Off Charge:
1) Turn ON Ni, Cathode Blocking and DD2 Bypass FETs, activate charger until Ni electrodes top-off charge is complete
2) ALL other FETs OFF Ni-Zn Disharging:
1) Turn ON Cathode and Anode FETs, Activate booster for discharge
2) All other FETs OFF Zn-Air Charging:
1) Turn ON OEE and Anode FETs, Activate charger until OEE electrodes are charged
2) All other FETs OFF Zn-Air Disharging:
1) Turn ON Cathode and Anode FETs, Activate booster for discharge
2) All other FETs OFF Zn-Air Deep Disharging:
1) Turn ON Cathode Blocking and Anode FETs, Activate Deep Discharge sequence
2) All other FETs OFF

FIG. 8

SERIES-MODE, CELL LEVEL ARCHITECTURE
CONCEPT 2: Independant Anode for Ni-Zn and Zn-Air Modes

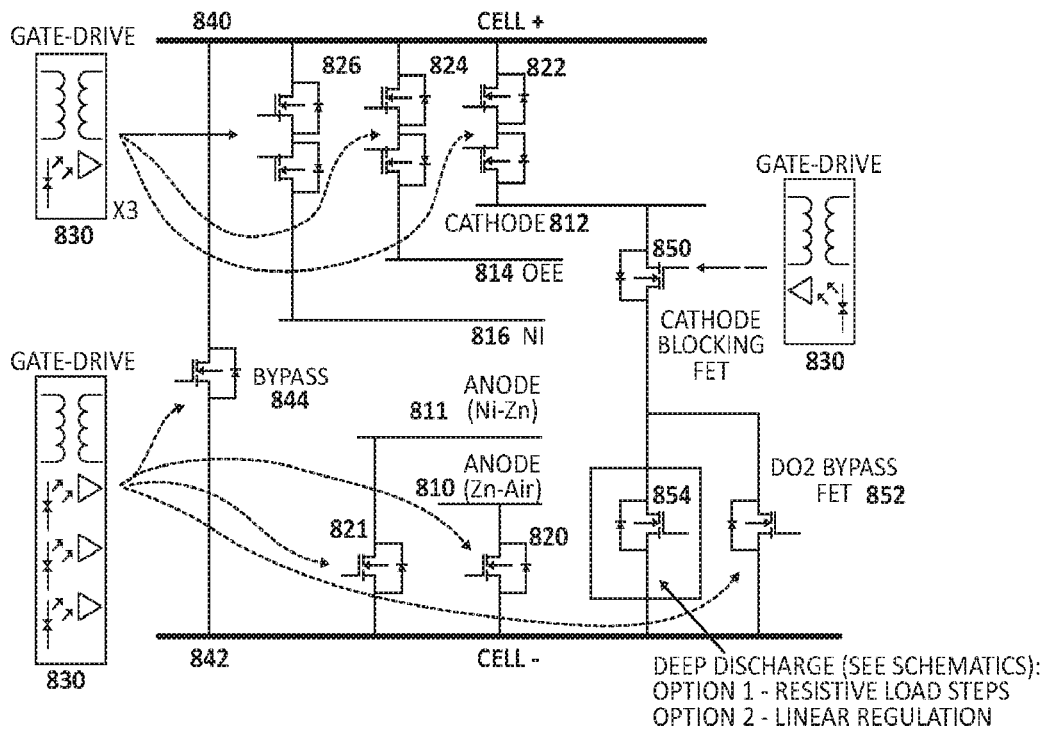

DEEP DISCHARGE (SEE SCHEMATICS):
OPTION 1 - RESISTIVE LOAD STEPS
OPTION 2 - LINEAR REGULATION

OPERATING MODES

Ni-Zn Charging:
1) Turn ON Ni and Ni-Zn Anode FETs, activate charger until electrodes are charged
2) All other FETs OFF Ni Top-Off Charge:
1) Turn ON Ni, Cathode Blocking and DD2 Bypass FETs, activate charger until Ni electrodes top-off charge is complete
2) ALL other FETs OFF Ni-Zn Disharging:
1) Turn ON Cathode and Ni-Zn Anode FETs, activate booster for discharge
2) All other FETs OFF Zn-Air Charging:
1) Turn ON OEE and Zn-Air Anode FETs, activate charger until OEE electrodes are charged
2) All other FETs OFF Zn-Air Disharging:
1) Turn ON Cathode and Zn-Air Anode FETs, activate booster for discharge
2) All other FETs OFF Zn-Air Deep Disharging:
1) Turn ON Cathode Blocking and Zn-Air Anode FETs, activate Deep Discharge sequence
2) All other FETs OFF

SERIES-MODE, TOP LEVEL ARCHITECTURE

FIG. 10

PARALLEL-MODE, CELL LEVEL ARCHITECTURE

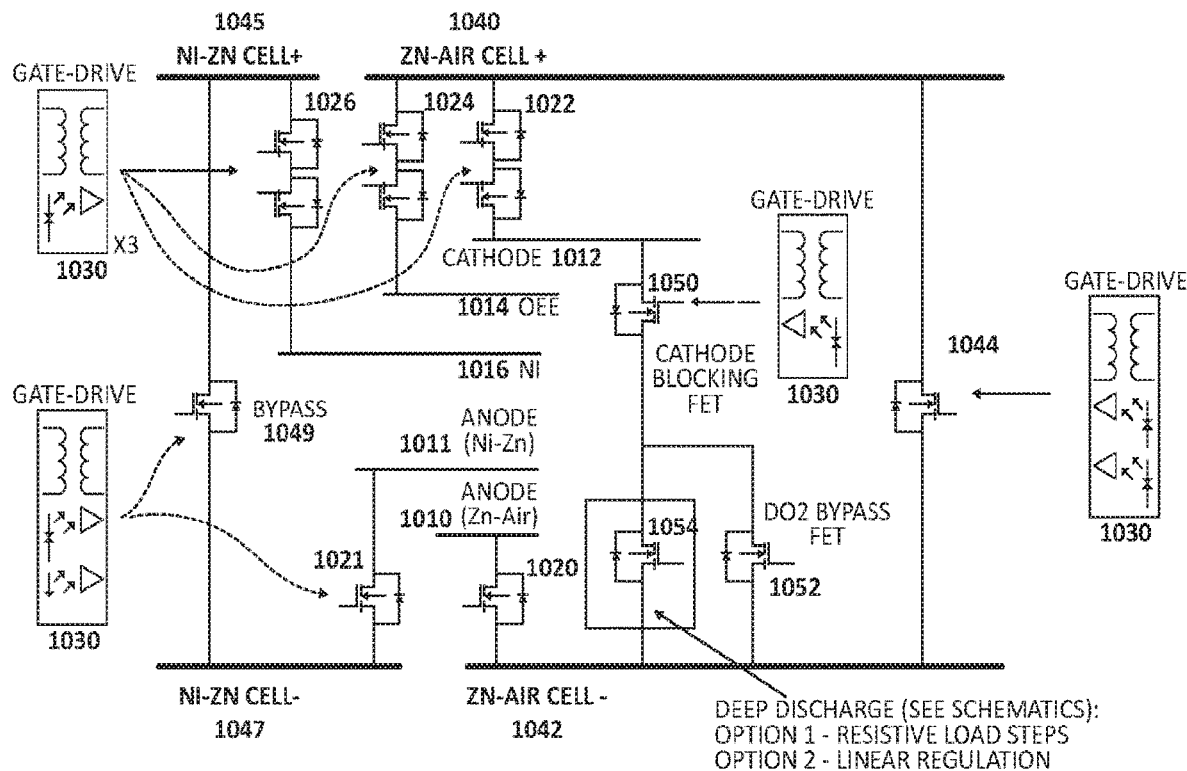

DEEP DISCHARGE (SEE SCHEMATICS):
OPTION 1 - RESISTIVE LOAD STEPS
OPTION 2 - LINEAR REGULATION

OPERATING MODES

Ni-Zn Charging:
1) Turn ON Ni and Ni-Zn Anode FETs, activate charger until Ni electrodes are charged
2) All other FETs OFF Ni Top-Off Charge:
1) Turn ON Ni, Cathode Blocking and DD2 Bypass FETs, activate charger until Ni electrodes top-off charge is complete
2) ALL other FETs OFF Ni-Zn Disharging:
1) Turn ON Cathode and Ni-Zn Anode FETs, activate booster for discharge
2) All other FETs OFF Zn-Air Charging:
1) Turn ON OEE and Zn-Air Anode FETs, activate charger until OEE electrodes are charged
2) All other FETs OFF Zn-Air Disharging:
1) Turn ON Cathode and Zn-Air Anode FETs, activate booster for discharge
2) All other FETs OFF Zn-Air Deep Disharging:
1) Turn ON Cathode Blocking and Zn-Air Anode FETs, activate Deep Discharge sequence
2) All other FETs OFF

PARALLEL-MODE, TOP LEVEL ARCHITECTURE

HYBRID ELECTROCHEMICAL CELL SYSTEMS AND METHODS OF OPERATION

CROSS REFERENCE TO RELATED APPLICATIONS

This patent application claims priority to provisional patent application 62/171,003 filed on Jun. 4, 2015 and PCT/US2016/036026, both of which are incorporated by reference herein in their entireties.

BACKGROUND

Rechargeable electrochemical cells are designed for charging to store input electrical current as energy, and discharging for outputting or releasing the stored energy as output electrical current. Each battery chemistry has particular advantages and disadvantages with regards to energy density, power density, efficiency, rechargeability, cost and so on. Effective combination of different battery chemistries to produce a hybrid battery may offer significant advantages which may be unavailable with a single battery chemistry. Typically, hybrid batteries may be provided as sub-cells each having a separate housing and ionically conductive medium relevant to a particular battery chemistry. An example of a hybrid system using a common electrolyte is shown in U.S. Patent Publication No. 2014/0272477 A1 (now U.S. Pat. No. 9,048,028) which discloses an alkaline electrolyte shared between a nickel-metal hydride cell and electrochemical capacitor to create a hybrid capacitor-battery system.

Metal-air batteries offer significant advantages in terms of energy density, as unlike most battery chemistries in which store oxidant is stored at the cathode, metal-air batteries use oxygen from the air as a source of oxidant. The existence of a continuous and virtually limitless oxidant source enables, in principle, high energy densities.

U.S. Patent Publication No. 2011/0250512 A1 (now U.S. Pat. No. 9,761,920) also shows a system designed for increased efficiency during shorter charge/discharge cycles, and higher storage ability for longer changer/discharge cycles. That application uses a fuel electrode, which may be coupled to an air electrode or a nickel electrode to create different cell behaviors in a common electrolyte.

SUMMARY

The present application discloses a variety of inventive features in the context of a hybrid cell including two (or more) sub-cells each with different cell chemistry. These inventive features include but are not limited to:
- a maintenance or "top off" mode in which a metal cathode and air/oxidant electrode are coupled to oxidize the metal of the metal cathode, to that it is replenished for its normal use in which its metal is reduced and coupled to an anode/fuel electrode that is oxidized;
- a convection mode in which an anode and oxygen evolving electrode of one sub-cell are coupled to generate evolved oxygen that helps circulate a common ionically conductive medium while the other sub-cell is undergoing a reaction, such as discharging;
- a control approach and/or architecture to enable sub-cells with separate anodes/fuel electrodes to function together for increased power output and/or enhanced management of state-of-charge;
- enhanced deep discharge control of sub-cells in a hybrid cell;
- charging mode for enhanced state-of-charge.

Other objects, features, and advantages of the present application will become apparent from the following detailed description and the appended drawings.

DESCRIPTION OF THE DRAWINGS

The following drawing(s) illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIG. 1 is a schematic diagram illustrating various physical configurations of the hybrid cell.

FIG. 2 is a diagram illustrating possible series terminal configurations.

FIG. 3 is a schematic diagram illustrating parallel terminal configurations.

FIG. 4 is a schematic diagram illustrating single and double electrode components.

FIG. 7 is a diagram illustrating cell-level circuit architecture for a series-connected cell comprising a common anode shared between sub-cells.

FIG. 8 is a diagram illustrating cell-level circuit architecture for a series-connected cell comprising an independent anode for each sub-cell.

FIG. 10 is a diagram illustrating cell-level circuit architecture for a parallel-connected hybrid cell.

DESCRIPTION OF ILLUSTRATIVE EMBODIMENTS

Figure 2A:
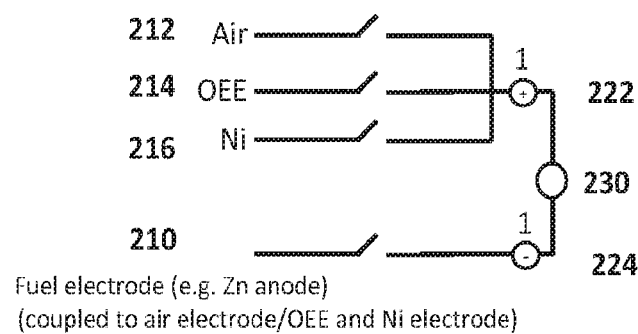
FIG. 2a is a schematic diagram illustrating series terminal configurations for embodiments with a common fuel electrode and FIG. 2b is a schematic diagram illustrating series terminal configurations for embodiments with a discrete metal fuel electrode.

The following disclosure describes systems and methods for operating hybrid electrochemical cells wherein the cell comprises a first pair of electrodes forming a first electrochemical sub-cell, wherein the first electrochemical sub-cell comprises a metal fuel electrode and an air electrode such that the first electrochemical sub-cell is characterized as a metal-air battery chemistry. The hybrid cell further comprises a second pair of electrodes forming a second electrochemical sub-cell, wherein the second electrochemical sub-cell comprises a metal fuel electrode with the same type of metal fuel in the first electrochemical sub-cell, and wherein the second electrochemical sub-cell is characterized as a different battery chemistry than the first electrochemical sub-cell. The cell comprises at least one ionically conductive medium communicating each pair of electrodes and a controller coupled to each pair of electrodes. The controller is configured to selectively generate an electrical current from at least one sub-cell in a discharge mode and selectively apply an electrical current to at least one sub cell in a charge mode.

FIG. 1 is a diagram illustrating several possible physical configurations of a hybrid cell with a first sub-cell comprising a zinc metal fuel electrode, or anode, paired to an air electrode, or cathode, and a second sub-cell comprising a zinc metal fuel electrode, a second anode, paired to a nickel electrode, a cathode. In the illustrated embodiments of FIG. 1, the common aspects between the first hybrid cell configuration 110, the second hybrid cell configuration 120 and the third hybrid cell configuration 130, are 1) a common metal fuel chemistry is shared between sub-cells, e.g. zinc and 2) all electrodes are connected to common electrical circuitry and an associated controller.

In the first cell hybrid cell configuration 110, the first sub-cell 112a and the second sub-cell 112b do not share a common ionically conductive medium such that a first ionically conductive medium 114a is associated with sub-cell 112a and a separate second ionically conductive medium 114b is associated with sub-cell 112b. The first sub-cell 112a comprises a metal fuel electrode 116a (e.g. Zn) and an air electrode 117a such that the first electrochemical sub-cell is characterized as a metal-air battery chemistry. The second electrochemical sub-cell 112b comprises a separate metal fuel electrode 116b characterized as having the same type of metal fuel in the first electrochemical sub-cell (e.g. Zn) and a positive electrode, or cathode 118b (e.g. Ni). Note that the terms anode and cathode refer to their respective discharge roles. The term anode may be interchangeable with the term negative electrode and the term cathode may be interchangeable with the term positive electrode. (Likewise, the terms fuel electrode and oxidant electrode, respectively, may be used, referring to the reactant involved at each.) The only requirement of the positive electrode, or cathode, 118b of the second sub-cell 112b is that it is characterized as having a standard redox potential greater i.e. more positive than the metal fuel electrode 116b. The second electrochemical sub-cell 112b is characterized as a different battery chemistry than the first electrochemical sub-cell 112a. Electrodes 116a, 116b, 117a and 118b are connected to common electrical circuitry and an associated controller generally depicted at 119. More detailed schematics relating to electrical circuitry and controller will be described in more detail later.

Referring again to FIG. 1, the second hybrid cell configuration 120 comprises a first sub-cell 122a and a second sub-cell 122b which share a common ionically conductive medium generally depicted at 124 communicating each pair of electrodes. The first sub-cell 122a comprises a metal fuel electrode 126a (e.g. Zn) and an air electrode 127a such that the first electrochemical sub-cell is characterized as a metal-air battery chemistry. The second electrochemical sub-cell 122b comprises a separate metal fuel electrode 126b characterized as having the same type of metal fuel in the first electrochemical sub-cell (e.g. Zn) and a positive electrode, or cathode 128b (e.g. Ni). The second electrochemical sub-cell 122a is characterized as a different battery chemistry than the first electrochemical sub-cell 122a. Electrodes 126a, 126b, 127a and 128b are connected to common electrical circuitry and an associated controller generally depicted at 129. More detailed schematics relating to electrical circuitry and controller will be described in more detail later.

Referring the third hybrid cell configuration 130 of FIG. 1, The first sub-cell #32a and the second sub-cell 132b share a common metal fuel electrode 136 (e.g. Zn). Furthermore, the sub-cells comprise a common ionically conductive medium generally depicted at 134. The first sub-cell 132a comprises metal fuel electrode 136 (e.g. Zn) and an air electrode 137a such that the first electrochemical sub-cell 132a is characterized as a metal-air battery chemistry. The second electrochemical sub-cell 132b comprises the same metal fuel electrode 136 in the first electrochemical sub-cell 132a (e.g. Zn) and a positive electrode, or cathode 138b (e.g. Ni).

FIG. 1 depicts a single distinct air electrode (117a, 127a and 137a of configurations 110, 120 and 130, respectively) which may be bifunctional (i.e. reduces oxygen on discharge and evolves oxygen on charge); however in some embodiments, a distinct oxygen evolution electrode (OEE) may be provided in addition to an air electrode such that the air electrode is used primarily for oxygen reduction on discharge, and the oxygen evolution electrode is used primarily for oxygen evolution on charge. Electrodes 136, 137a and 138b are connected to common electrical circuitry and an associated controller generally depicted at 139. More detailed schematics relating to electrical circuitry and controller will be described in more detail later.

Figure 2B:
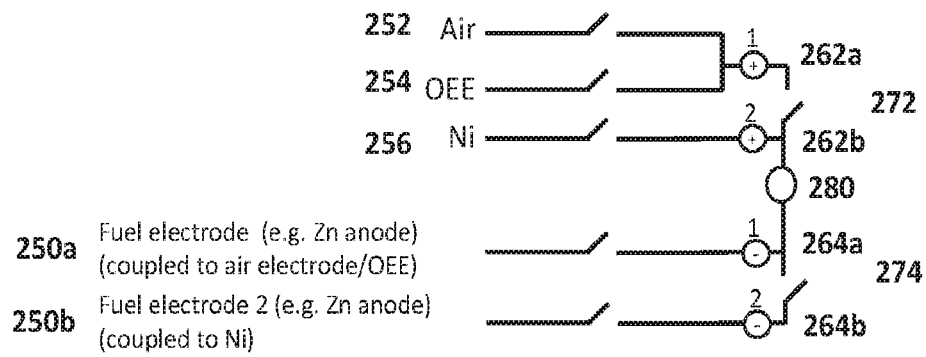

FIG. 2 is a diagram illustrating possible series terminal configurations. FIG. 2a depicts a series terminal connection for embodiments with a common fuel electrode 210 (e.g., 130 in FIG. 1) wherein a first sub-cell comprises a fuel electrode 210 paired to an air cathode 212 and an oxygen evolution electrode (OEE) 214. In this example, the air cathode 212 is a distinct electrode separate from a distinct OEE electrode 214, however, in other embodiments, an air electrode may be provided as a single bifunctional electrode such that it reduces oxygen in a discharge mode and evolves oxygen in a charge mode, in which case a distinct and separate oxygen evolution electrode (OEE) is absent. In FIG. 2b, a second sub-cell comprises the same fuel electrode 210 as the first electrochemical sub-cell 210 (e.g. Zn) paired to a positive electrode, or cathode 216 (e.g. Ni). The terminal configuration of FIG. 2a depicts a single positive terminal 222 and a single negative terminal 224 connected to an external load or power supply generally depicted at 230.

FIG. 2b depicts a series terminal connection for embodiments wherein each sub-cell comprises a distinct metal fuel electrode (e.g., 110 and 120 in FIG. 1). In FIG. 2b, metal fuel electrode 250a (e.g. Zn) is generally paired to an air electrode 252 and an OEE 254 whereas metal fuel electrode 250b (e.g. Zn) is generally paired to a positive electrode, or cathode 256 (e.g. Ni). The series terminal configuration enables an option to swap the pairs coupled during operation such that fuel electrode 250a could be paired to the positive electrode 256 and fuel electrode 250b could be paired to the air electrode 252 and/or OEE 254, for example during a maintenance mode. FIG. 2b depicts a distinct oxygen evolution electrode (OEE) 254 and a distinct air cathode 252 however, in some embodiments a single air electrode may be provided instead of a distinct air cathode 252 and a distinct OEE 254 wherein the single air electrode is bifunctional i.e.

reduces oxygen on discharge and evolves oxygen on charge. The terminal configuration of FIG. 2b depicts a positive terminal 262a and a negative terminal 264a associated with a first sub-cell characterized as a metal-air battery chemistry; and a positive terminal 262b and a negative terminal 264b associated with a second sub-cell characterized as a different battery chemistry than the first sub-cell. The first positive terminal 262a may be connected to the second positive terminal 262b via a positive terminal switch 272; the first negative terminal 264a may be connected to the second negative terminal 264b via a negative terminal switch 274; and the positive and negative terminals 262b and 264a may be further connected via to an external load or power supply generally depicted at 280 such that terminals are connected in series.

FIG. 3 is a diagram illustrating parallel terminal configurations for a hybrid cell wherein each sub-cell comprises a distinct metal fuel electrode. In the diagram, metal fuel electrode 310a (e.g. Zn) is coupled to an air cathode 314 and an OEE 316 whereas fuel electrode 310b (e.g. Zn) is coupled to a cathode 312 (e.g. nickel electrode). FIG. 3 depicts a distinct oxygen evolution electrode (OEE) 316 and a distinct air cathode 314 however, in some embodiments a single air electrode may be provided instead of a distinct air electrode and a distinct OEE electrode such that the single air electrode is bifunctional i.e. reduces oxygen on discharge and evolves oxygen on charge. The parallel terminal configuration of FIG. 3 depicts a positive terminal 322a and a negative terminal 324a connected by a switch 330a to the power source associated with a first sub-cell characterized as a metal-air battery chemistry. The positive terminal 322b and negative terminal 324b are connected via a switch 330b to the power source associated with a second sub-cell characterized as a different battery chemistry than the first sub-cell.

FIG. 4 is a diagram illustrating single and double electrode components. In some embodiments, the metal electrodes of the hybrid cell may be provided as single metal electrodes as depicted in FIG. 4a, for example to provide a hybrid cell with higher power capability. The example of FIG. 4a depicts three singular fuel electrodes e.g. Zn (410a, 410b and 410c), two air electrodes (412a and 412b) and two metal cathodes e.g. Ni (414a and 414b). In this example, a singular air electrode is depicted for each; however, in other embodiments a separate air cathode and a separate OEE electrode may be provided. As depicted in FIG. 4b, the electrodes may be provided as a plurality of metal electrodes to increase the charge capacity of the cell, enable electrode replacement, provide hybrid cell with higher energy density, a combination thereof. In the example of FIG. 4b, four singular fuel electrodes e.g. Zn (420a, 420b, 420c and 420d), two air electrodes (422a and 422b) are depicted. The metal cathodes e.g. Ni are combined together in pairs with the aid of a structural tie 430 such that electrodes 424a and 424b are combined and electrodes 424c and 424d are combined.

Figure 5:
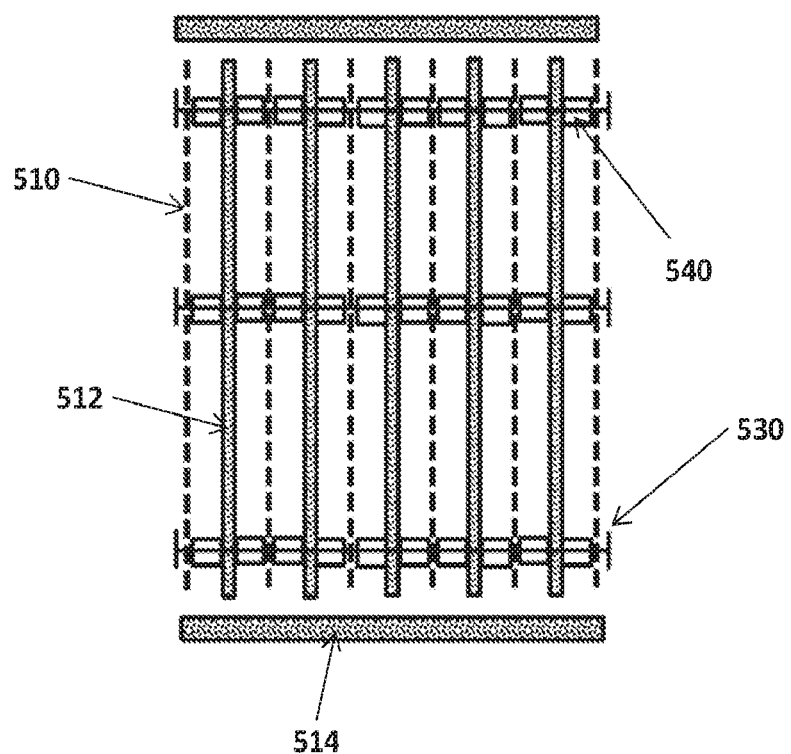
FIG. 5 is a schematic diagram illustrating a thin electrode configuration of components.

FIG. 5 is a diagram illustrating a thin electrode configuration wherein a plurality of metal fuel electrodes e.g. Zn, generally depicted as dashed lines 510, is provided in an alternating manner with a plurality of metal cathodes e.g. Ni, labeled as 512 for simplicity, to produce a central matrix of sub-cells of a particular chemistry (e.g. Ni—Zn). The desired configuration may be set with the aid of structural ties 530, spacers 540, or a combination thereof. In the illustration of FIG. 5, air electrodes 514 may be provided at boundaries to the central matrix of (Ni—Zn) sub-cells to produce a second matrix of sub-cells comprising a metal fuel anode 510 and air electrode 514, the second matrix of sub-cells being characterized as a metal-air battery chemistry.

Figure 6:
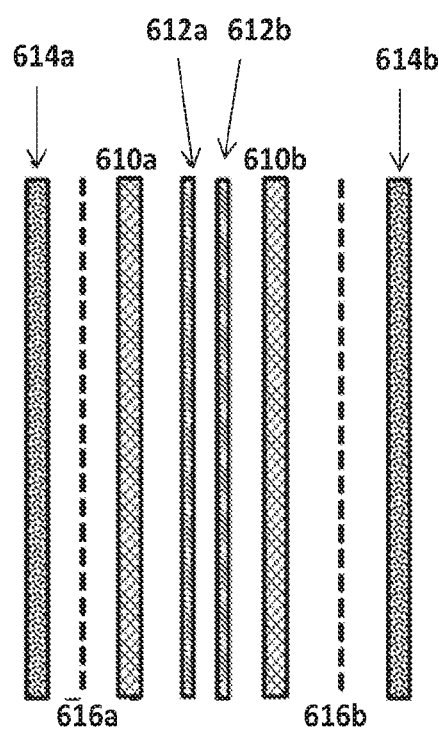
FIG. 6 is a schematic diagram illustrating a symmetric configuration of components.

FIG. 6 is a diagram illustrating a symmetric configuration for a hybrid cell comprising two anodes 610a and 610b (e.g. Zn metal fuel electrode) and two metal cathodes (e.g. Ni) 612a and 612b situated therebetween. The hybrid cell of FIG. 6 further comprises two air cathodes 614a and 614b and two OEEs 616a and 616b, each OEE 616 being situated between a fuel electrode 610 and an air cathode 614. In the example of FIG. 6, two metal cathodes (e.g. Ni) 612a and 612b are depicted, however in some embodiments a single metal cathode may be provided. Further details on symmetric configurations and methods of operation are further described in U.S. Pat. No. 9,484,587 (U.S. patent application Ser. No. 14/619,373), incorporated herein in its entirety.

As used herein, the term "metal cathode" refers to a cathode comprising a metal that is reduced during discharge (and oxidized during re-charge). The examples herein include the Ni electrode which reduces from $Ni(OH)_2$ to $NiOOH$, and oxidizes in reverse. This term is not meant to refer to a cathode that has a catalyst metal that is not reduced/oxidized. According to an embodiment, the hybrid cells disclosed herein may be operated according to various charge modes including:

1) selectively applying an electrical current to charge a sub-cell comprising an anode (e.g. Zn metal fuel electrode, Fe metal fuel electrode, etc.) and a metal cathode (e.g. Ni electrode, Ag electrode, etc.), wherein the electrochemical reaction may proceed according to, e.g., $Zn(OH)_2 + 2e^- \rightarrow Zn + 2\ OH^-$ at a Zn fuel electrode; $2\ Ni(OH)_2 + 2\ OH^- \rightarrow 2\ NiOOH + 2H_2O$ at a Ni positive electrode, with the overall electrochemical reaction according to $2\ Ni(OH)_2 + Zn(OH)_2 \rightarrow 2\ NiOOH + Zn + 2H_2O$;

2) selectively applying an electrical current to charge a sub-cell comprising an anode (e.g. Zn metal fuel electrode, Fe metal fuel electrode) and an OEE, wherein the electrochemical reaction may proceed according to $Zn(OH)_2 + 2e^- \rightarrow Zn + 2\ OH^-$ at a Zn anode; $2\ OH^- \rightarrow \frac{1}{2}\ O_2 + H_2O + 2e^-$ at the OEE, with an overall electrochemical reaction according to $2\ Zn(OH)_2 \rightarrow 2\ Zn + O_2 + 2\ H_2O$.

3) a maintenance charge mode by selectively applying an electrical current to charge a sub-cell comprising a metal cathode (e.g. Ni electrode, Ag electrode) and an air cathode, wherein the electrochemical reaction may proceed according to $2\ Ni(OH)_2 + 2\ OH^- \rightarrow 2\ NiOOH + 2H_2O$ at a Ni electrode, $\frac{1}{2}\ O_2 + H_2O + 2e^- \rightarrow 2\ OH^-$ at the air cathode of the first sub-cell, with the overall electrochemical reaction according to $2\ Ni(OH)_2 + \frac{1}{2}\ O_2 \rightarrow 2\ NiOOH + H_2O$. This may be performed as a maintenance step to provide a 'top-off' or 'make-up' charge for the metal cathode (e.g. Ni electrode) of the second sub-cell i.e. the metal electrode not generally paired to the air electrode.

According to an embodiment, the hybrid cells disclosed herein may be operated according to various discharge modes including:

1) selectively generating an electrical current by discharging a sub-cell comprising an anode (e.g. Zn metal fuel electrode, Fe metal fuel electrode) and a metal cathode (e.g. Ni electrode, Ag electrode), wherein the electrochemical reaction proceeds according to $Zn + 2OH^- \rightarrow Zn(OH)_2 + 2e^-$ at a Zn anode; $2\ NiOOH + 2H_2O \rightarrow 2\ Ni(OH)_2 + 2\ OH^-$ at a Ni cathode, with the overall electrochemical reaction according to $2\ NiOOH + Zn + 2H_2O \rightarrow 2\ Ni(OH)_2 + Zn(OH)_2$;

2) selectively generating an electrical current by discharging a sub-cell comprising an anode (e.g. Zn metal fuel electrode, Fe metal fuel electrode) and an air electrode, or air cathode, wherein the electrochemical reaction proceeds according to $Zn+2\ OH^- \to Zn(OH)_2+2e^-$ at a Zn anode; $\frac{1}{2}\ O_2+H_2O+2e^- \to 2\ OH^-$ at the air cathode with the overall electrochemical reaction according to $2\ Zn+O_2+2\ H_2O \to 2\ Zn(OH)_2$.

3) a maintenance deep discharge mode by selectively generating an electrical current by discharging a sub-cell comprising an anode (e.g. Zn metal fuel electrode, Fe metal fuel electrode) and an air cathode, wherein the electrochemical reaction proceeds according to $Zn+2\ OH^- \to Zn(OH)_2+2\ e^-$ at a Zn anode; $\frac{1}{2}\ O_2+H_2O+2e^- \to 2\ OH^-$ at the air cathode with the overall electrochemical reaction according to $2\ Zn+O_2+2\ H_2O \to 2\ Zn(OH)_2$. Maintenance modes relating to metal fuel electrodes are previously described in U.S. patent application Ser. No. 14/512,933 (now published under 20150104679 A1) and U.S. Provisional Application No. 61/938,922, incorporated herein in their entirety. The reaction of the maintenance deep discharge is the same, but the discharge is driven to purposefully oxidize the zinc or other fuel to clean or reset the electrode.

In some embodiments, the hybrid cell may enter a convection mode by selectively applying an electrical current to charge a sub-cell comprising an anode (e.g. Zn metal fuel electrode, Fe metal fuel electrode), or other auxiliary electrode of any suitable configuration or material and an OEE, where for example, the electrochemical reaction may proceed according to $Zn(OH)_2+2\ e^- \to Zn+2\ OH-$ at a Zn anode; $2\ OH- \to \frac{1}{2}\ O_2+H_2O+2e-$ at the OEE, with an overall electrochemical reaction according to $2\ Zn(OH)_2 \to 2\ Zn+O_2+2\ H_2O$ for the first sub-cell. Simultaneously, the second electrochemical sub-cell is in a discharge mode by selectively generating an electrical current by discharging the second sub-cell comprising an anode (e.g. Zn metal fuel electrode, Fe metal fuel electrode) and a metal cathode (e.g. Ni electrode, Ag electrode), wherein the electrochemical reaction proceeds according to $Zn+2OH- \to Zn(OH)2+2e-$ at a Zn anode; $2\ NiOOH+2H_2O \to 2\ Ni(OH)_2+2\ OH-$ at a Ni cathode, with the overall electrochemical reaction at in the second sub-cell according to $2\ NiOOH+Zn+2H2O \to 2\ Ni(OH)_2+Zn(OH)_2$. In some embodiments, it may be advantageous to provide a convective flow within the ionically conductive medium while discharging the second sub-cell.

FIG. 7 is a diagram illustrating cell-level circuit architecture for a series-connected hybrid cell comprising a common anode metal fuel electrode 710 (e.g. Zn, Fe) and a common ionically conductive medium. A first electrochemical sub-cell comprises the anode 710, an air cathode 712 and an oxygen evolution electrode (OEE) 714 such that the first electrochemical sub-cell is characterized as a metal-air battery chemistry. FIG. 7 depicts a distinct oxygen evolution electrode (OEE) 714 and a distinct air cathode 712 however, in some embodiments a single air electrode may be provided in place of a distinct air cathode and a distinct OEE in which case the air electrode may be bifunctional i.e. reduces oxygen on discharge and evolves oxygen on charge. A second electrochemical sub-cell comprises the same anode 710 as the first sub-cell and a metal cathode 716 (e.g. Ni, Ag) such that the second electrochemical sub-cell is characterized as a different battery chemistry than the first electrochemical sub-cell but shares the same metal fuel anode 710 as in the first electrochemical sub-cell.

In an embodiment, each electrode may be associated with a switch, or a high-power transistor e.g. a power field-effect transistor (FET) operatively coupled between a controller and terminals associated with the electrodes. As depicted in FIG. 7, metal fuel electrode 710 is associated with switch 720, air cathode 712 is associated with switch 722, oxygen evolution electrode (OEE) 714 is associated with switch 724 and metal cathode 716 is associated with switch 726. In an embodiment, each switch may be associated with a gate driver 730, or power amplifier that accepts a low-power input from a controller and produces a high-current drive input for a gate, or switch, of a high-power transistor e.g. a power field-effect transistor (FET) associated with each electrode. The series terminal configuration of FIG. 7 depicts a single positive terminal 740 and a single negative terminal 742 for connection to a load for output of current or power source for input of current, and connected via a bypass switch 744. Additionally, FIG. 7 depicts a cathode blocking switch 750 connecting air cathode 712 to a deep discharge bypass switch 752 and deep discharge switch 754. The function of deep discharge switch 754 and related circuitry will be described in later in FIG. 16 and FIG. 17.

In an embodiment, a controller may be configured to control an open state and a closed state for each of the plurality of switches, and furthermore, the controller may be configured to select between operating modes. Referring to FIG. 7, a controller may select between various operating modes including:

1) Charging the second sub-cell (e.g. Ni—Zn) wherein the second sub-cell cathode (e.g. Ni) switch 726 and anode (e.g. Zn) switch 720 are closed (on) to allow external electrical current to flow to the sub-cell, with the remaining switches being in an open (off) state;

2) Charging the metal cathode 716 as a maintenance step to provide a 'top-off' or 'make-up' charge wherein the metal cathode switch 726, the cathode blocking switch 750 and deep discharge bypass switch 752 are closed (on) to allow external electrical current to flow to the cell, with the remaining switches being in an open (off) state;

3) Discharging the second sub-cell (e.g. Ni—Zn) wherein the second sub-cell cathode (e.g. Ni) switch 726 and anode (e.g. Zn) switch 710 are closed (on) to allow electrical current to flow from the sub-cell to an external load, with the remaining switches being in an open (off) state;

4) Charging the first metal-air sub-cell (e.g. Zn-air) wherein the OEE switch 724 and anode (e.g. Zn) switch 710 are closed (on) to allow an external electrical current to flow to the sub-cell, with the remaining switches being in an open (off) state;

5) Discharging the first metal-air sub-cell (e.g. Zn-air) wherein the air cathode switch 722 and anode (e.g. Zn) switch 720 are closed (on) to allow electrical current to flow from the from the sub-cell to an external load, with the remaining switches being in an open (off) state;

6) Maintenance deep discharging the first metal-air sub-cell (e.g. Zn-air) wherein the cathode blocking switch 750 and anode (e.g. Zn) switch 720 are closed (on) with the remaining switches being in an open (off) state. Activation of the deep discharge switch 754 allows electrical current to flow from the anode 710 out of the cell via a deep discharge linear regulation method or a deep discharge resistive step method described in FIG. 16 and FIG. 17, respectively.

FIG. 8 is a diagram illustrating cell-level circuit architecture for a series-connected cell comprising an independent anode, or metal fuel electrode, for each sub-cell. A first electrochemical sub-cell comprises an anode 810 (e.g. Zn metal fuel electrode), an air cathode 812 and an oxygen evolution electrode (OEE) 814 such that the first electrochemical sub-cell is characterized as a metal-air battery chemistry. FIG. 8 depicts a distinct oxygen evolution electrode (OEE) 814 and a distinct air cathode 812; however, in some embodiments a single air electrode may be provided in place of a distinct air cathode and a distinct OEE.

A second electrochemical sub-cell comprises an independent anode 811 (e.g. Zn) and a metal cathode 816 (e.g. Ni) such that the second electrochemical sub-cell is characterized as a different battery chemistry, i.e. Ni—Zn, than the first electrochemical sub-cell but shares the same type of metal fuel e.g. Zn as in the first electrochemical sub-cell.

In an embodiment, each electrode may be associated with a switch, or a high-power transistor e.g. a power field-effect transistor (FET) operatively coupled between a controller and terminals associated with the electrodes. As depicted in FIG. 8, metal fuel electrode 810 is associated with switch 820, metal fuel electrode 811 is associated with switch 821, air cathode 812 is associated with switch 822, oxygen evolution electrode (OEE) 814 is associated with switch 824 and metal cathode 816 is associated with switch 826. In an embodiment, each switch may be associated with a gate driver 830, or power amplifier that accepts a low-power input from a controller and produces a high-current drive input for a gate, or switch, of a high-power transistor e.g. a power field-effect transistor (FET) associated with each electrode. The series terminal configuration of FIG. 8 depicts a single positive terminal 840 and a single negative terminal 842 connected via a bypass switch 844. Additionally, FIG. 8 depicts a cathode blocking switch 850 connecting air cathode 812 to a deep discharge bypass switch 852 and deep discharge switch 854. The function of deep discharge switch 854 and associated circuitry will be described in later in FIG. 16 and FIG. 17.

In an embodiment, a controller may be configured to control an open state and a closed state for each of the plurality of switches, and furthermore, the controller may be configured to select between operating modes. Referring to FIG. 8, a controller may select between various operating modes including:

1) Charging the second sub-cell (e.g. Ni—Zn) wherein the second sub-cell cathode (e.g. Ni) switch 826 and anode (e.g. Zn) switch 821 are closed (on) to allow external electrical current to flow to the sub-cell, with the remaining switches being in an open (off) state;

2) Charging the metal cathode 816 as a maintenance step to provide a 'top-off' or 'make-up' charge wherein the metal cathode switch 826, the cathode blocking switch 850 and deep discharge bypass switch 852 are closed (on) to allow external electrical current to flow to the cell, with the remaining switches being in an open (off) state;

3) Discharging the second sub-cell (e.g. Ni—Zn) wherein the second sub-cell cathode (e.g. Ni) switch 826 and anode (e.g. Zn) switch 821 are closed (on) to allow electrical current to flow from the sub-cell to an external load, with the remaining switches being in an open (off) state;

4) Charging the first metal-air sub-cell (e.g. Zn-air) wherein the OEE switch 824 and anode (e.g. Zn) switch 820 are closed (on) to allow an external electrical current to flow to the sub-cell, with the remaining switches being in an open (off) state;

5) Discharging the first metal-air sub-cell (e.g. Zn-air) wherein the air cathode switch 822 and anode (e.g. Zn) switch 820 are closed (on) to allow electrical current to flow from the from the sub-cell to an external load, with the remaining switches being in an open (off) state;

6) Maintenance deep discharging the first metal-air sub-cell (e.g. Zn-air) wherein the cathode blocking switch 850 and anode (e.g. Zn) switch 820 are closed (on) with the remaining switches being in an open (off) state. Activation of the deep discharge switch 854 allows electrical current to flow from the anode 810 out of the cell via a deep discharge linear regulation method or a deep discharge resistive step method described in FIG. 16 and FIG. 17, respectively.

Figure 9:
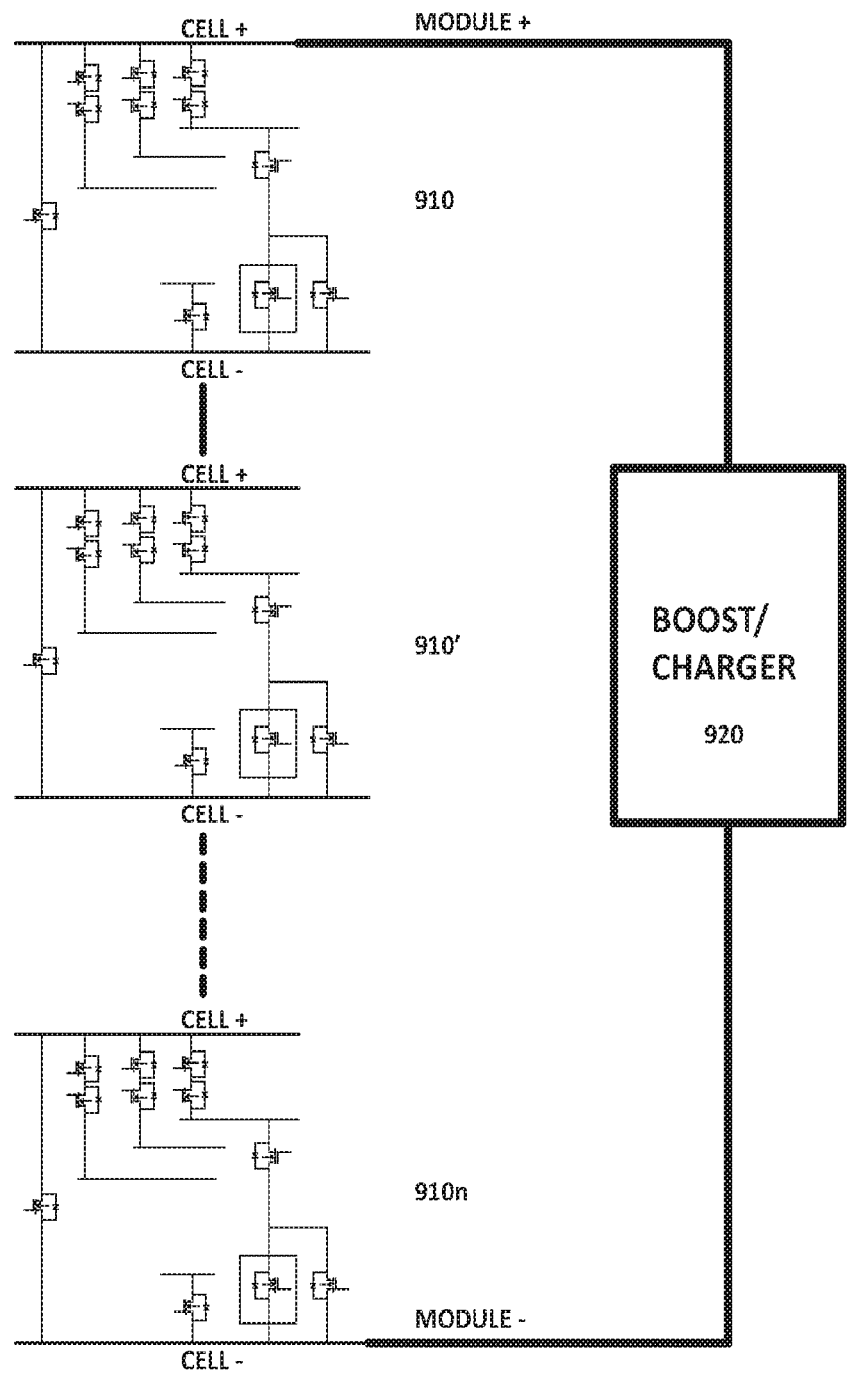
FIG. 9 is a diagram illustrating module-level circuit architecture for series-connected hybrid cells.

FIG. 9 is a diagram illustrating module-level circuit architecture for series-connected hybrid cells such as those exemplary series-connected hybrid cells depicted in FIG. 7 and FIG. 8. The hybrid cells (910, 910', 910*n*) are operatively connected in series to a boost/charger component 920 for discharge and charge operations of the module.

The boost/charger component 920 comprises the elements of 1) a boost converter, or step-up converter, which is a DC-to-DC power converter with an output voltage greater than its input voltage and 2) a charger, or buck converter which is a voltage step down and current step up converter.

In an embodiment, the boost converter element may contain at least two semiconductors (e.g. a diode and a transistor) and at least one energy storage element (e.g. a capacitor, inductor, or the two in combination) and may be characterized as a type of switched-mode power supply (SMPS). As another example, the boost converter element may be provided as current-fed push-pull converter commonly known to those skilled in the electrical engineering arts. In an embodiment, the boost converter may be selected to have a power inductor on an input-side of the converter (e.g. conventional boost converter, current-fed push pull, etc.) In some embodiments, filters comprising capacitors (sometimes in combination with inductors) may be added to an output of the boost converter element to reduce output voltage ripple.

In an embodiment, the charger element may be selected to have a power inductor on an output-side of the converter (e.g. conventional buck, voltage push-pull, full-bridge converter, etc.). As an example, the charger may be provided as a buck converter known to those skilled in the art wherein the current in an inductor is controlled by two switches (e.g. a transistor and a diode).

FIG. 10 is a diagram illustrating cell-level circuit architecture for a parallel-connected hybrid cell. A first electrochemical sub-cell comprises an anode 1010 (e.g. Zn), an air cathode 1012 and an oxygen evolution electrode (OEE) 1014 such that the first electrochemical sub-cell is characterized as a metal-air battery chemistry. FIG. 10 depicts a distinct oxygen evolution electrode (OEE) 1014 and a distinct air cathode 1012 however, in some embodiments a single air electrode for both functions may be provided. A second electrochemical sub-cell comprises an independent anode 1011 (e.g. Zn) and a metal cathode 1016 (e.g. Ni) such that the second electrochemical sub-cell is characterized as a different battery chemistry, e.g. Ni—Zn, than the first electrochemical sub-cell but shares the same type of metal fuel e.g. Zn as in the first electrochemical sub-cell.

In an embodiment, each electrode may be associated with a switch, or a high-power transistor e.g. a power field-effect transistor (FET) operatively coupled between a controller and terminals associated with the electrodes. As depicted in FIG. 10, metal fuel electrode 1010 is associated with switch 1020, metal fuel electrode 1011 is associated with switch 1021, air cathode 1012 is associated with switch 1022, oxygen evolution electrode (OEE) 1014 is associated with switch 1024 and metal cathode 1016 is associated with switch 1026. In an embodiment, each switch may be associated with a gate driver 1030, or power amplifier that accepts a low-power input from a controller and produces a high-current drive input for a gate, or switch, of a high-power transistor e.g. a power field-effect transistor (FET) associated with each electrode.

The parallel terminal configuration of FIG. 10 depicts a first positive terminal 1040 and a first negative terminal 1042 connected via a first bypass switch 1044 associated with a first sub-cell characterized as a metal-air battery chemistry. Furthermore, the parallel terminal configuration of FIG. 10 depicts a second positive terminal 1045 and a second negative terminal 1047 connected via a second bypass switch 1049 associated with a second sub-cell characterized as a different battery chemistry than the first sub-cell. Additionally, FIG. 10 depicts a cathode blocking switch 1050 connecting air cathode 1012 to a deep discharge bypass switch 1052 and deep discharge switch 1054. The function of deep discharge switch 1054 and associated circuitry will be described later in FIG. 16 and FIG. 17.

In an embodiment, a controller may be configured to control an open state and a closed state for each of the plurality of switches, and furthermore, the controller may be configured to select between operating modes. Referring to FIG. 10, a controller may select between various operating modes including:

1) Charging the second sub-cell (e.g. Ni—Zn) wherein the second sub-cell cathode (e.g. Ni) switch 1026 and anode (e.g. Zn) switch 1021 are closed (on) to allow external electrical current to flow to the sub-cell via terminals 1045, 1047, with the remaining switches being in an open (off) state;

2) Charging the metal cathode 1016 as a maintenance step to provide a 'top-off' or 'make-up' charge wherein the metal cathode switch 1026, the cathode blocking switch 1050 and deep discharge bypass switch 1052 are closed (on) to allow external electrical current to flow to the cell via terminals 1026, 1042, with the remaining switches being in an open (off) state;

3) Discharging the second sub-cell (e.g. Ni—Zn) wherein the second sub-cell cathode (e.g. Ni) switch 1026 and anode (e.g. Zn) switch 1021 are closed (on) to allow electrical current to flow from the sub-cell to an external load via terminals 1045, 1047, with the remaining switches being in an open (off) state;

4) Charging the first metal-air sub-cell (e.g. Zn-air) wherein the OEE switch 1024 and anode (e.g. Zn) switch 1020 are closed (on) to allow an external electrical current to flow to the sub-cell via terminals 1040, 1042, with the remaining switches being in an open (off) state;

5) Discharging the first metal-air sub-cell (e.g. Zn-air) wherein the air cathode switch 1022 and anode (e.g. Zn) switch 1020 are closed (on) to allow electrical current to flow from the from the sub-cell to an external load via terminals 1040, 1042, with the remaining switches being in an open (off) state;

6) Maintenance deep discharging the first metal-air sub-cell (e.g. Zn-air) wherein the cathode blocking switch 1050 and anode (e.g. Zn) switch 1020 are closed (on) with the remaining switches being in an open (off) state. Activation of the deep discharge switch 1054 allows electrical current to flow from the anode 1010 out of the cell via a deep discharge linear regulation method or a deep discharge resistive step method described in FIG. 16 and FIG. 17, respectively.

Figure 11:
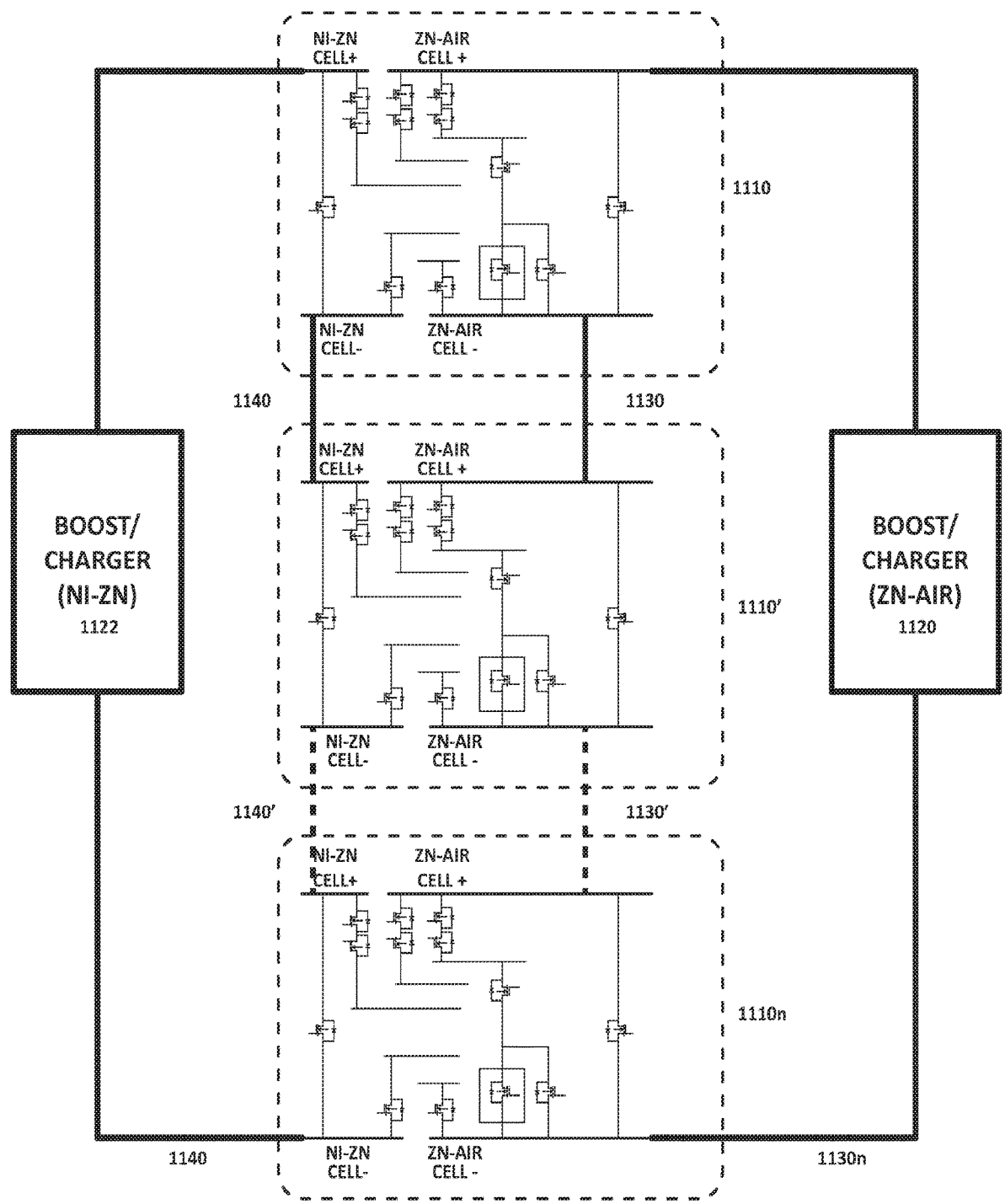
FIG. 11 is a diagram illustrating module-level circuit architecture for parallel-connected hybrid cells.

FIG. 11 is a diagram illustrating module-level circuit architecture for parallel-connected hybrid cells (1110, 1110', 1110n), wherein the hybrid cells may each be equivalent to the cell depicted in FIG. 10. The first metal-air sub-cells may be operatively connected to a first boost/charger 1120 via circuit 1130-1130'-1130n. The second sub-cells may be operatively connected a second boost/charger 1122 via circuit 1140-1140'-1140n. The exemplary module circuitry enables parallel discharge and charge operations of the module.

Figure 12:
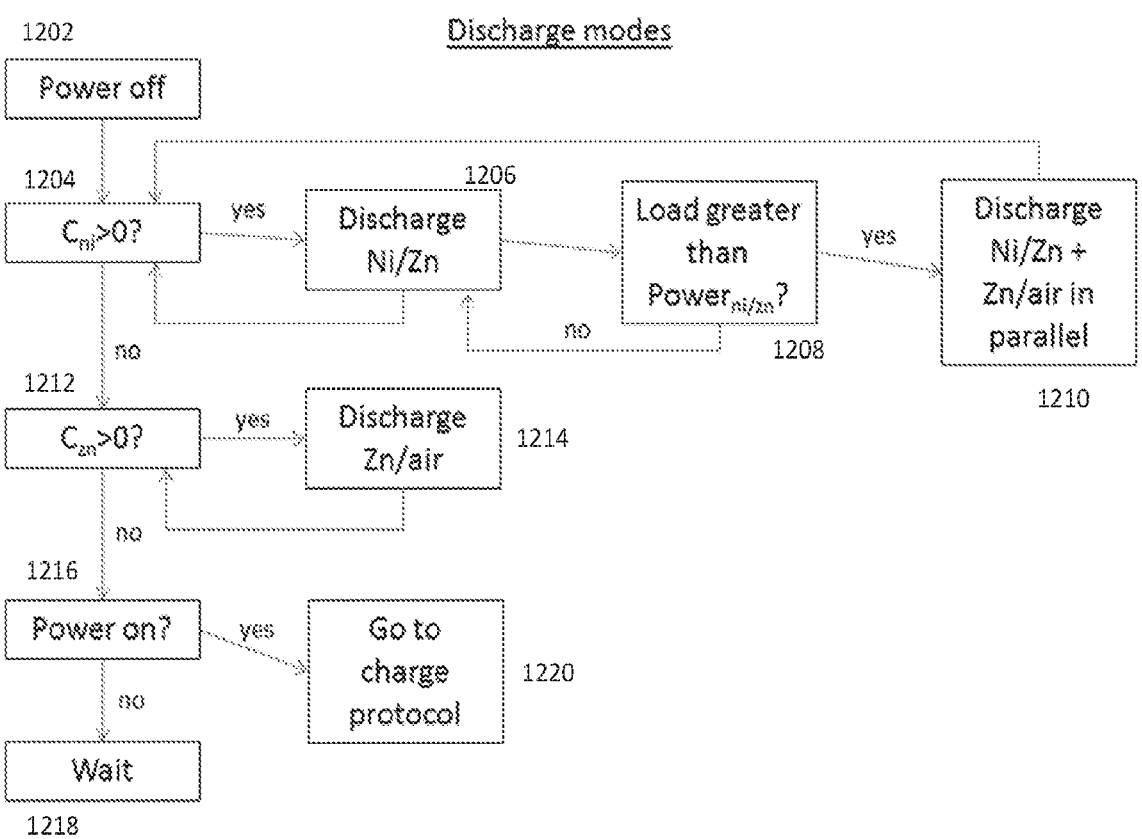
FIG. 12 is a diagram illustrating exemplary operation logic for discharge modes.

FIG. 12 is a diagram illustrating exemplary operation logic for discharge modes of the hybrid cell. As an exemplary embodiment, the following example will be described in terms of a hybrid cell comprising a first zinc-air sub-cell and a second Ni—Zn sub-cell. Once external grid power is off and/or there is demand to power an external load at 1202, the state of charge (SOC), or charge capacity, of the Ni—Zn sub-cell may be evaluated at 1204. In an embodiment, the charge capacity may be determined or have been already determined from a voltage measurement, a current measurement, an impedance measurement, a time lapse or a combination thereof. If the Ni—Zn sub-cell charge capacity is above a predetermined value, the Ni—Zn sub-cell may enter a discharge mode at 1206. In some embodiments, this mode may be referred to as a high power discharge mode wherein the Ni—Zn sub-cell discharges to the load and the metal-air sub-cell is idle. If the power capability of the discharging Ni—Zn sub-cell falls below the power demand of the external load at 1208, the hybrid cell may enter a high power parallel discharge mode at 1210 wherein the Ni—Zn sub-cell and the Zn-air sub-cell are discharged simultaneously to supply power to the load.

Again referring to FIG. 12, if the charge capacity of the Ni—Zn sub-cell falls below a predetermined charge capacity at 1204, the charge capacity of the Zn-air sub-cell may be evaluated at 1212. If the Zn-air sub-cell charge capacity is above a predetermined value, the Zn-air sub-cell may enter a discharge mode at 1214. In some embodiments, this mode may be referred to as a high energy discharge mode wherein the first Zn-air sub-cell discharges to the load and the second Ni—Zn sub-cell is idle. If the charge capacity of the Zn-air sub-cell falls below a predetermined charge capacity at 1212, and the external grid power is unavailable (off) or there is no demand from the external load at 1216, the hybrid cell may enter an idle mode at 1218. If instead the external grid power is available (on) or there is power available from an external power source at 1216, the hybrid cell may enter a charge mode at 1220.

Figure 13:
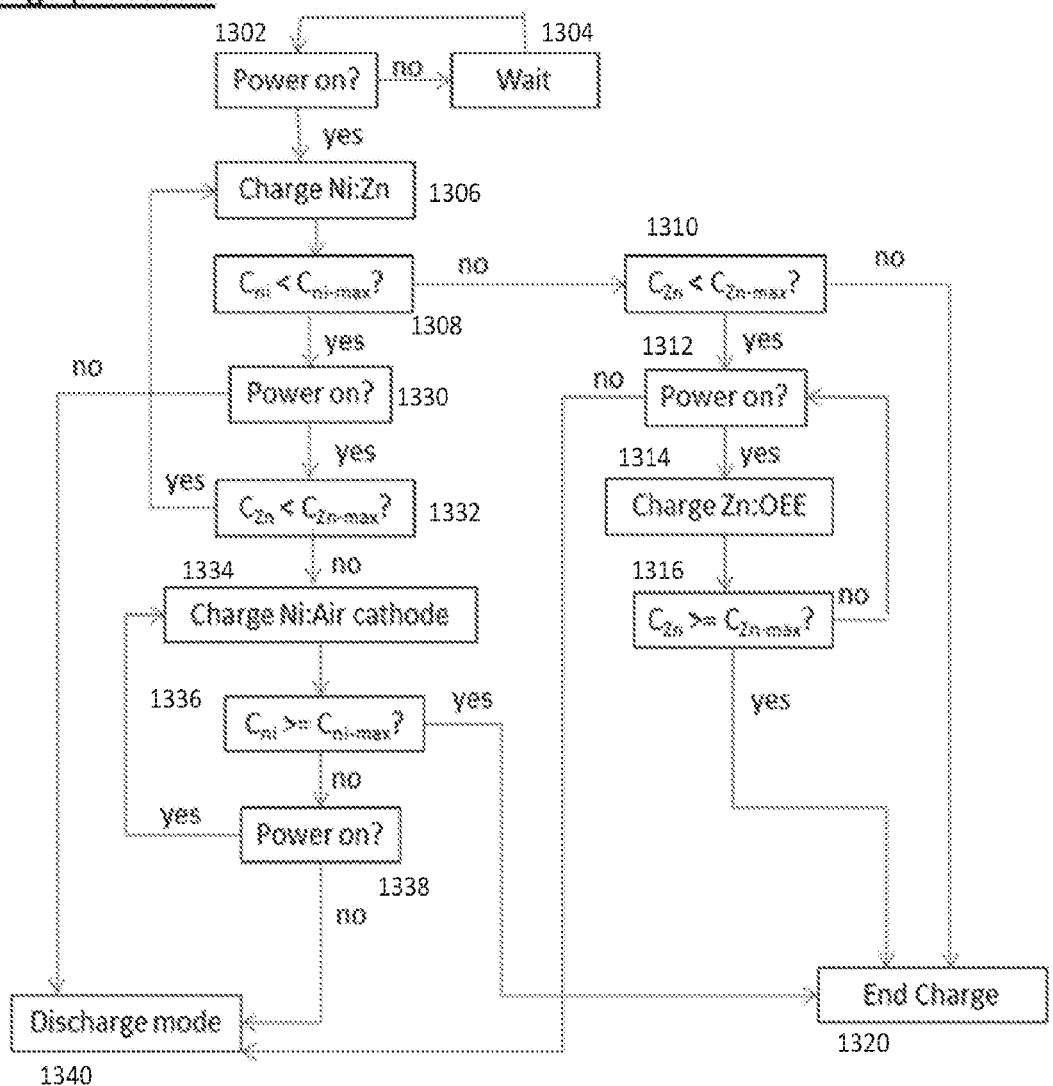
FIG. 13 is a diagram illustrating exemplary operation logic for charge modes.

FIG. 13 is a diagram illustrating exemplary operation logic for hybrid cell charge modes. As an exemplary embodiment, the following example will be described in terms of a hybrid cell comprising a first zinc-air sub-cell and a second Ni—Zn sub-cell. If the external grid power is unavailable (off) and/or there is no demand from the external load at 1302, the hybrid cell may enter an idle mode at 1304. Once external grid power or external power source is available at 1302, the Ni—Zn sub-cell may be charged at 1306. The state of charge (SOC), or charge capacity, of the Ni—Zn sub-cell may be evaluated at 1308. If the SOC of the Ni—Zn sub-cell is above a predetermined maximum value at 1308, the SOC of the Zn-air cell may be evaluated at 1310. If the SOC of the Zn-air sub-cell is above a predetermined maximum value at 1310, the hybrid cell may enter an idle mode at 1320 wherein the cell rests in a charged state. If instead the SOC of the Zn-air sub-cell is below a predetermined maximum value at 1310 and the external grid power source is available at 1312, the Zn-air sub-cell will enter a charge mode at 1314. If the SOC of the Zn-air sub-cell is above a predetermined maximum value at 1316, the hybrid cell may enter an idle mode at 1320 wherein the cell is rests in a charged state.

If the Ni—Zn sub-cell is below a predetermined maximum value at 1308, the hybrid cell may enter a discharge mode at 1340 if an external power source becomes unavailable at 1330. If the external power source is available at 1330 and the SOC of the Zn-air sub-cell is below a predetermined maximum value at 1332, the Ni—Zn sub-cell will continue in a charge mode at 1306. If however the SOC of the Zn-air sub-cell is above a predetermined maximum value at 1332, the nickel electrode of the second sub-cell will enter a maintenance 'top-off' charge mode at 1334 wherein the electrochemical reaction may proceed according to 2 $Ni(OH)_2 + 2\ OH^- \rightarrow 2\ NiOOH + 2H_2O$ at a Ni electrode and ½ $O_2 + H_2O + 2e^- \rightarrow 2\ OH^-$ at the air cathode of the first sub-cell, with the overall electrochemical reaction according to 2 $Ni(OH)_2 + ½\ O_2 \rightarrow 2\ NiOOH + H_2O$. This may be performed as a maintenance step to provide a 'top-off' or 'make-up' charge for the metal electrode (e.g. Ni electrode) of the second sub-cell i.e. the metal electrode not generally paired to the air electrode or OEE.

If the capacity of the nickel electrode reaches a predetermined maximum value at 1336, the hybrid cell may enter an idle mode wherein the cell rests in a charged state. If the capacity of the nickel electrode remains below a predetermined maximum value at 1336 and the external power source is unavailable at 1338, the cell may enter a discharge mode at 1340. If the capacity of the nickel electrode reaches a predetermined maximum value at 1336, the hybrid cell may enter an idle mode wherein the cell is rests in a charged state. If the capacity of the nickel electrode remains below a predetermined maximum value at 1336 and the external power source is unavailable at 1338, the cell may enter a discharge mode at 1340.

Figure 14A:
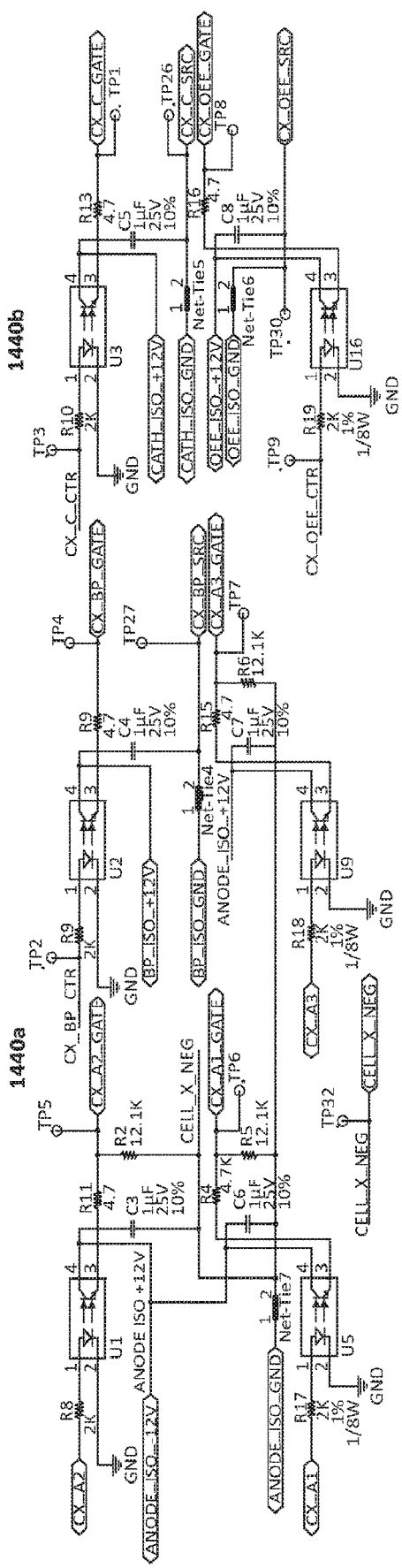
FIGS. 14(a) and 14(b) are diagrams illustrating circuit architecture enabling optocoupler drives (a) and isolated power supplies (b), respectively.
Figure 14B:
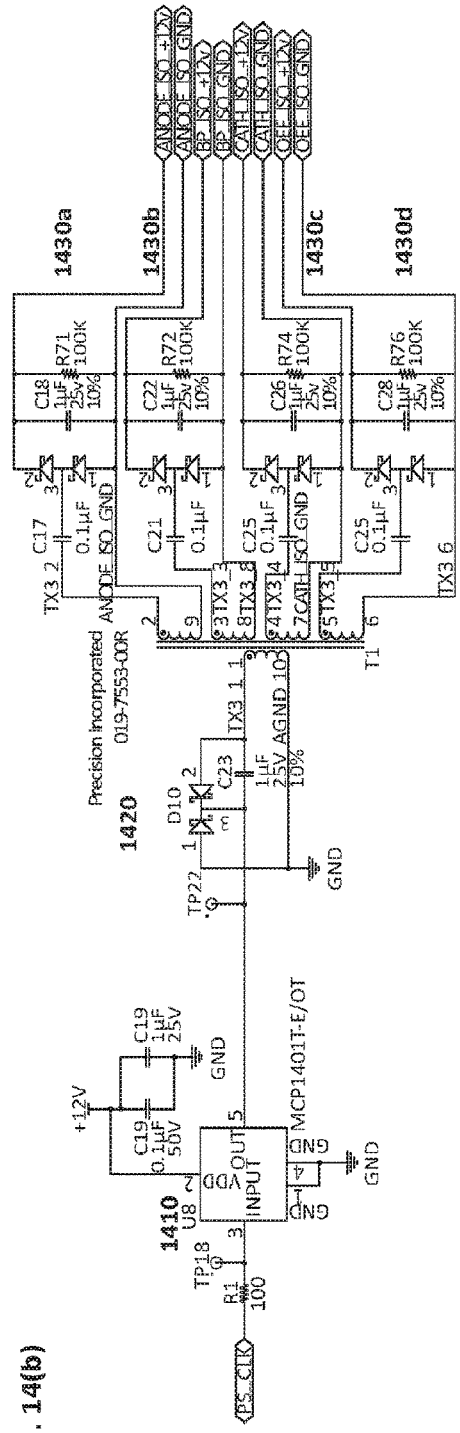

Diagrams illustrating exemplary circuit architecture enabling switching, or activation, of a high-power transistor e.g. a power field-effect transistor (FET) operatively coupled to a terminal associated with an electrode, a controller and a gate drive, or optocoupler drive (see FIG. 14(*a*)) with associated isolated power supplies (FIG. 14(*b*)) are also shown. The gate drive or power amplifier accepts a low-power input from a controller and produces a high-current drive input for a gate, or switch, of a high-power transistor e.g. a power field-effect transistor (FET) associated with each electrode.

In an embodiment depicted in FIG. 14(*a*) and FIG. 14(*b*), activation of a switch, or FET, setting it in a closed (on) state may conform to the steps of: 1) a driver 1410 amplifies a voltage input (e.g. +5V) from a controller to a greater signal (e.g. +12V signal amplitude); 2) transformer 1420 is driven with a square wave (e.g. 200 kHz frequency) to create four isolated voltage (e.g. +12V) rails on secondary windings 1430*a-d*; and, 3) a controller sends an Enable signal (e.g. +5V) to an optocoupler drive 1440, which passes isolated voltage signal (e.g. +12V) across a FET 1440*a* or 1440*b* (i.e. gate-to-source), thereby activating the switch to a closed (on) setting.

Figure 15:
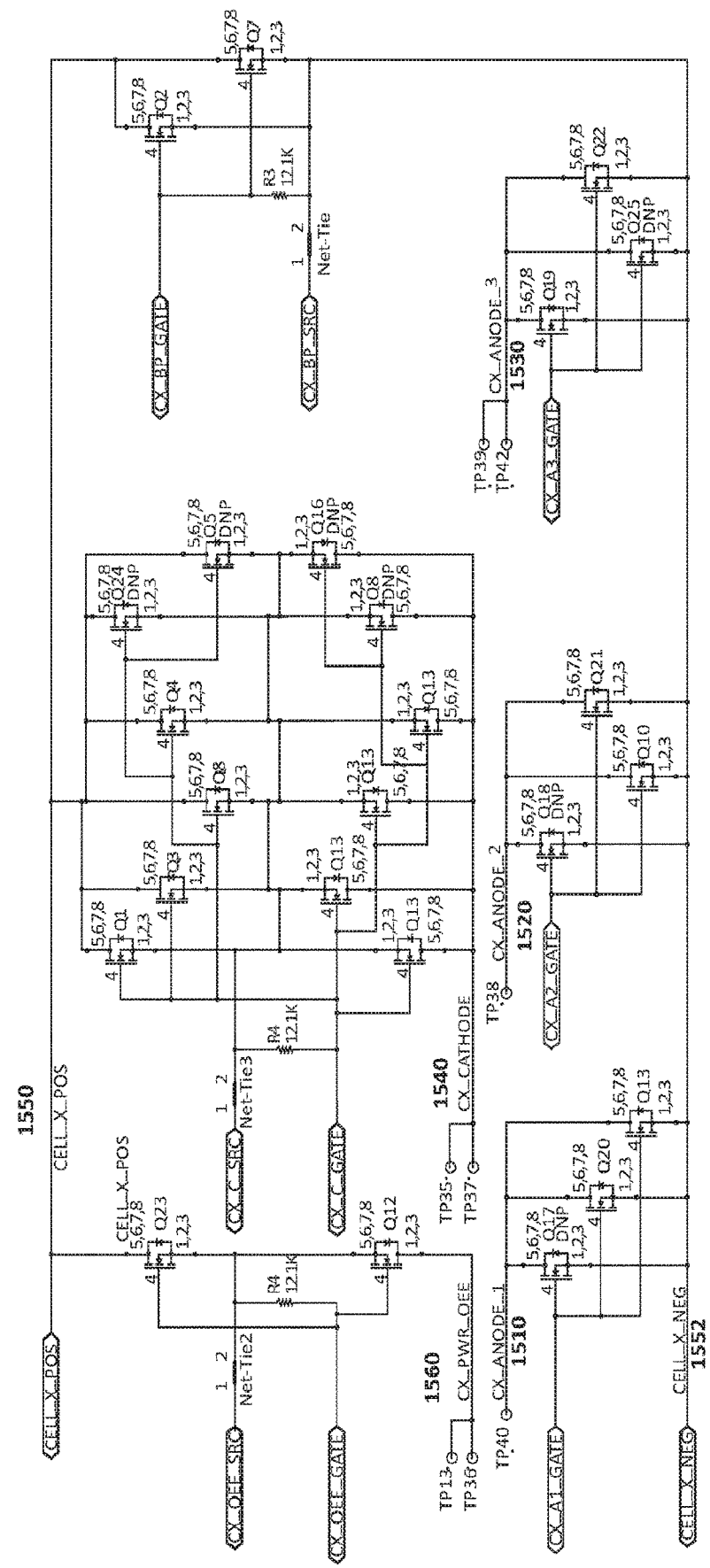
FIG. 15 is a diagram illustrating power MOSFET circuit architecture.

According to an embodiment depicted in FIG. 15, a power metal-oxide-semiconductor field-effect transistor (MOSFET) may be provided as a switch operatively coupled to a terminal associated with an electrode. In the example of FIG. 15, three metal fuel anodes (1510, 1520, and 1530) and a cathode 1540 are connected in a parallel configuration to meet a predetermined resistance requirement (e.g. 1-2 mOhm) between a positive cell terminal 1550 and a negative cell terminal 1552. In the example of FIG. 15, it may be appreciated to those skilled in the art that a 'back-to-back' FET configuration may be used for OEE 1560 and cathode 1540 to prevent undesired current flow in to and/or out of respective terminals.

Figure 16:
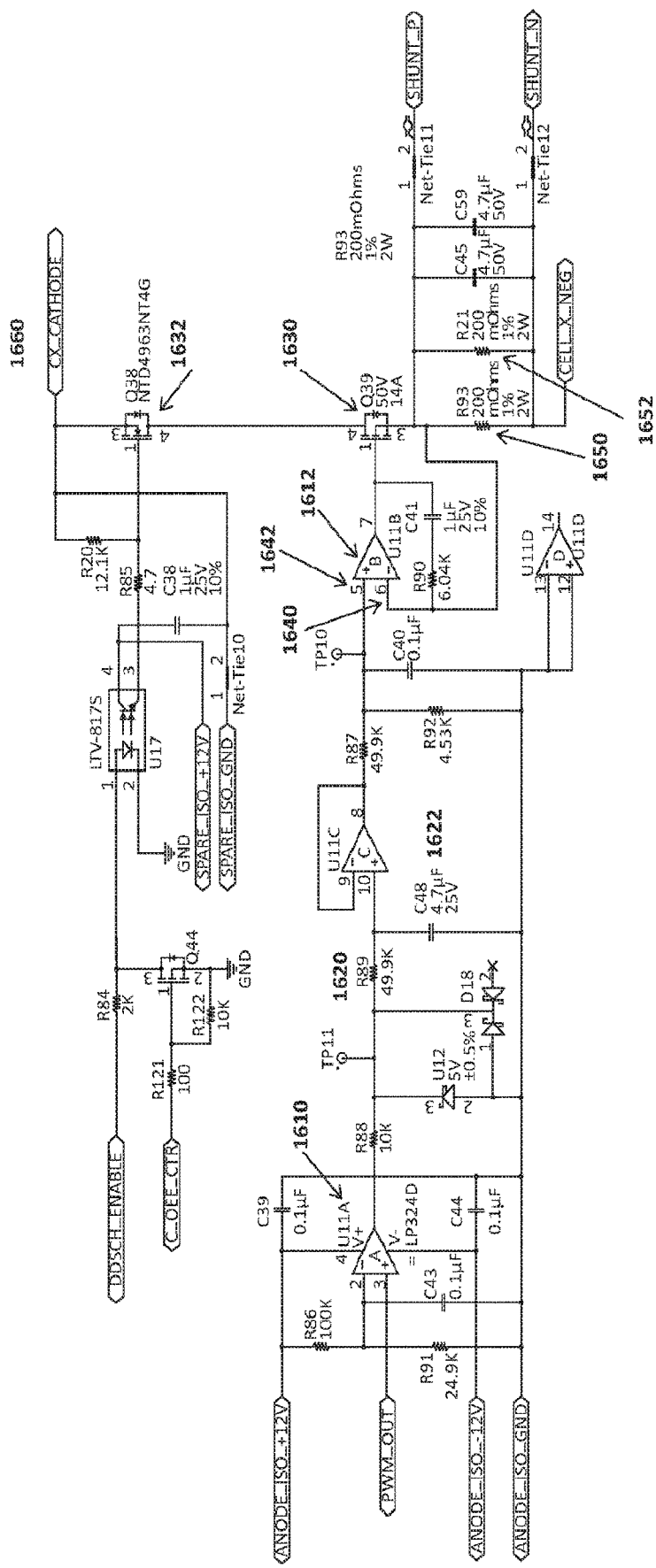
FIG. 16 is a diagram illustrating circuit architecture enabling deep discharge via a linear regulation method.

FIG. 16 is a diagram illustrating circuit architecture enabling deep discharge via a linear regulation method. FIG. 16 provides an example of further detailed schematics for the deep discharge switch and associated circuitry for functional block 754 of FIG. 7, 854 of FIG. 8 and 1054 of FIG. 10. An exemplary method of operating the circuitry of FIG. 16 may conform to the steps of: 1) a controller generates a square wave (e.g. 1 kHz) with a variable duty cycle (0-100%); 2) amplifier 1610 level-shifts a signal (at TP11) with an amplitude of +5V (max) and −0.5V (min); 3) Resistor 1620 and capacitor 1622 filter a square wave signal into a DC value, which is used as a reference voltage to amplifier 1612; 4) amplifier 1612 operates as a closed-loop linear regulator whereby amplifier 1612 controls MOSFET 1630 (in the linear region) to maintain equal voltage at Pin 1640 (Feedback) and Pin 1642 (Reference); 5) Constant voltage at Pin 1640 results in constant current across resistors 1650 and 1652 (e.g. 10-500 mOhm), thereby setting a constant discharge current determined by the controller; 6) MOSFET 1632 ensures current does not flow in the cathode 1660 (e.g. 1540 in FIG. 15) through MOSFET 1630 body diode. The negative cell terminal CELL_X_NEG match 1552 in FIG. 15.

Figure 17:
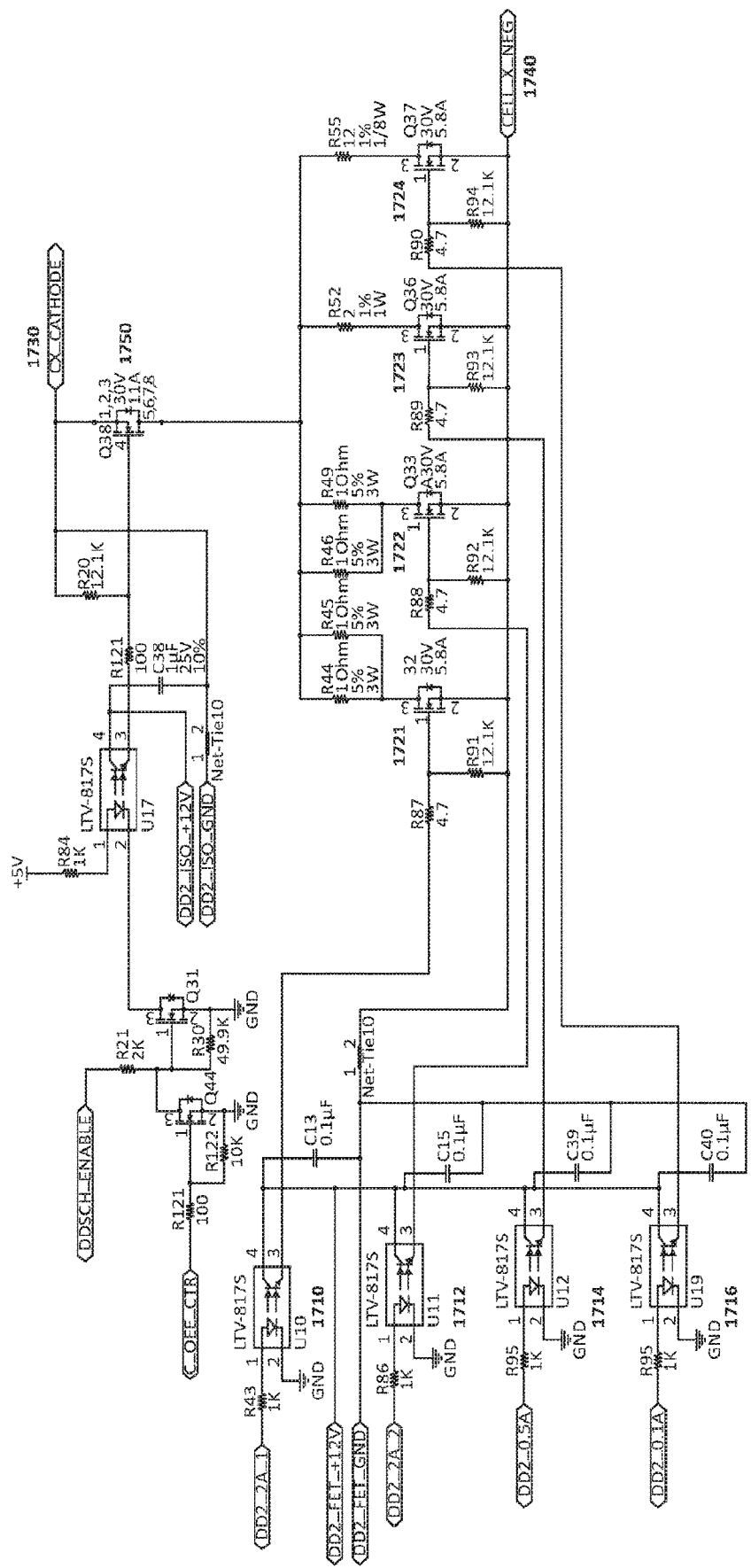
FIG. 17 is a diagram illustrating circuit architecture enabling deep discharge via a resistive step method.

FIG. 17 is a diagram illustrating circuit architecture enabling deep discharge via a resistive step method. FIG. 17 provides an example of further detailed schematics for the deep discharge switch and associated circuitry for functional block 754 of FIG. 7, 854 of FIG. 8 and 1054 of FIG. 10. An exemplary method of operating the circuitry of FIG. 17 may conform to the steps of: 1) controller determines a load requirement during a deep discharge mode and enables an appropriate gate drive, or optocoupler (1710, 1712, 1714, and/or 1716); 2) an optocoupler connects an isolated voltage (e.g. +12V) to activate, i.e. close or turn on respective switches, or FETs (1720, 1722, 1724, and/or 1726) subsequently connecting resistor loads across cathode 1730 and negative cell terminal 1740 (e.g. 1552 in FIG. 15; 3) MOSFET 1750 ensures current does not flow into the cathode 1730 (e.g., 1540 in FIG. 15).

Figure 18:
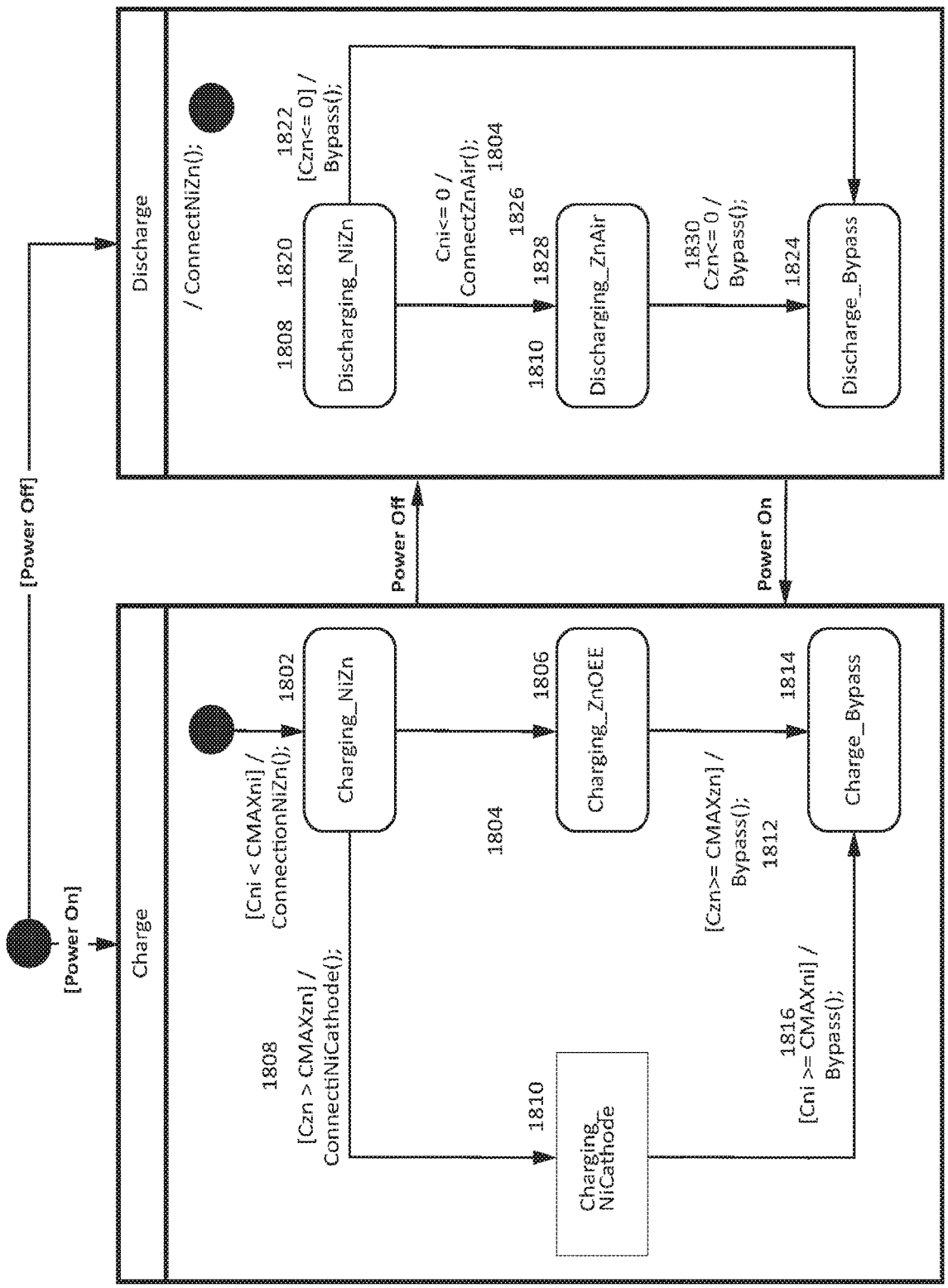
FIG. 18 is a diagram illustrating charging and discharging protocols of an exemplary NiZn/Zn-air hybrid cell.

FIG. 18 illustrates charging and discharging protocols for an exemplary NiZn/Zn-air hybrid cell. In this non-limiting example, a single Zn electrode is shared between the Ni electrode and the air-breathing cathode for discharging purposes. In other embodiments, the cell design may use dedicated or a plurality of Zn electrodes for each of the positive discharging electrodes.

According to an embodiment depicted in FIG. 18, the hybrid cells disclosed herein may be operated according to various charge modes including:

1) Charging Ni—Zn at 1802: if power from an external load is available. The NiZn/Zn-air cell charges the Ni electrode using the Zn anode as a first step by connecting the Ni electrode to the cell positive terminal (+ve) and the Zn electrode to the cell negative terminal (−ve). If the Ni capacity (Cni) exceeds a maximum predetermined charging capacity of the Ni electrode at 1804, the Zn electrode may be charged using the OEE at 1806. If the Zn capacity (Czn) exceeds a maximum predetermined charging capacity of the Zn electrode at 1808, the Ni electrode will then be charged using the air-breathing cathode as a negative electrode at 1810.

2) Charging Zn-OEE at 1806: if charging power is available, and the Ni electrode is charged to maximum capacity at 1804, the Zn electrode is charged by connecting the OEE to the cell positive (+ve) terminal and the Zn electrode to the cell negative (−ve) terminal at 1806. If the Zn capacity (Czn) exceeds a predetermined maximum charging capacity of the Zn electrode at 1812, the cell is completely charged and will bypass allowing other cells connected in series and/or parallel to complete charging at 1814.

3) Charging Ni-Cathode at 1810: if charging power is available, and the Zn electrode is completely charged at 1808, but the Ni electrode needs charging, the Ni electrode is charged by connecting the Ni electrode to the cell positive (+ve) terminal and connecting the air-breathing cathode to the cell negative (−ve) terminal at 1810. If the Ni capacity exceeds a predetermined maximum charging capacity of the Ni electrode at 1816, the cell is completely charged and will bypass allowing other cells connected in series and/or parallel to complete charging at 1814.

4) Charge Bypass at 1814: If the cell is completely charged, all electrodes are disconnected from the cell terminals and the cell is bypassed using, for example, a solid-state switch that connects the cell positive terminal (+ve) to the cell negative terminal (−ve). This allows other cells in a module connected in series and/or parallel to continue charging.

According to an embodiment depicted in FIG. 18, the hybrid cells disclosed herein may be operated according to various charge modes including:

1) Discharging Ni—Zn at 1820: if charging power is not available, the NiZn is initially discharged by connecting the Ni electrode to the cell positive (+ve) terminal and the Zn electrode to the cell negative (−ve) terminal. If the capacity of the Zn electrode reaches zero or a predetermined minimum value at 1822, the cell is bypassed at 1824, allowing other cells connected in series and/or parallel to continue discharging. If the capacity of the Ni electrode reaches zero or a predetermined minimum value at 1826, the Zn electrode is discharged using the air-breathing cathode at 1828.

2) Discharging Zn-air at 1828: if charging power is not available and the Ni electrode is completely discharged at 1826, the Zn electrode will continue to discharge using the air-breathing cathode by connecting the air-breathing cathode to the cell positive (+ve) terminal and the Zn electrode to the cell negative terminal (−ve). If the capacity of the Zn electrode reaches zero or a predetermined minimum value at 1830, the cell is bypassed at 1824, allowing other cells connected in series and/or parallel to continue discharging.

3) Discharge Bypass at 1824: if the cell is completely discharged or otherwise selected to be bypassed for maintenance or otherwise, all electrodes are disconnected from the cell terminals and the cell is bypassed using, for example, a solid-state switch that connects the cell positive terminal (+ve) to the cell negative terminal (−ve). This allows other cells in the module connected in series and/or parallel to continue discharging.

The above specification and examples provide exemplary embodiments described with a certain degree of particularity, or with reference to one or more individual embodiments, however those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

What is claimed:

1. A hybrid electrochemical cell comprising:
   i. a first pair of electrodes forming a first electrochemical sub-cell, wherein the first electrochemical sub-cell comprises a first metal electrode and an air electrode such that the first electrochemical sub-cell is characterized as a metal-air battery chemistry;
   ii. a second pair of electrodes forming a second electrochemical sub-cell, wherein the second electrochemical sub-cell comprises a second metal electrode with the same type of metal in the first electrochemical sub-cell, the second metal electrode being distinct from the first metal electrode, and wherein the second electrochemical sub-cell is characterized as a different battery chemistry than the first electrochemical sub-cell;
   iii. at least one ionically conductive medium communicating each pair of electrodes;
   iv. a controller coupled to each pair of electrodes; and
   v. a plurality of switches, each switch being operatively coupled between the controller and one of the terminals associated with each of the electrodes,
   wherein the controller is configured to selectively generate an electrical current from at least one sub-cell in a discharge mode and selectively apply an electrical current to at least one sub cell in a charge mode;
   wherein the controller controls the charge mode and the discharge mode based on at least one input parameter; and
   wherein the controller is configured to control an open state and a closed state for each of the plurality of switches, and wherein said controller is configured to select between operating modes, the operating modes comprising:
   i. high energy discharge mode wherein the first electrochemical sub-cell is in a discharge mode and the second electrochemical sub-cell is in an idle mode;
   ii. high power discharge mode wherein the second electrochemical sub-cell is in a discharge mode and the first electrochemical sub-cell is in an idle mode;
   iii. high power parallel discharge mode wherein the first electrochemical sub-cell and second electrochemical sub-cell are connected in parallel and the first electrochemical sub-cell is in a discharge mode and the second electrochemical sub-cell is in a discharge mode; and
   iv. maintenance mode wherein at least one sub-cell is in a 'deep discharge' mode, reset mode, or top-off charge mode.

2. The hybrid electrochemical cell of claim 1, wherein the first sub-cell and second sub-cell share a common electrochemically oxidizable species.

3. The hybrid electrochemical cell of claim 2, wherein the common electrochemically oxidizable species is selected from the group of zinc, aluminum, iron, nickel, silver.

4. The hybrid electrochemical cell of claim 2, wherein the common electrochemically oxidizable species is zinc.

5. The hybrid electrochemical cell of claim 1, wherein the controller is operatively connected to a sensor that senses a condition of the hybrid electrochemical cell and wherein the input parameter is the condition sensed by the sensor.

6. The hybrid electrochemical cell of claim 1, wherein the second electrochemical sub-cell is characterized as alkaline battery chemistry.

7. The hybrid electrochemical cell of claim 1, wherein the second electrochemical sub-cell is characterized as nickel-zinc battery chemistry.

8. The hybrid electrochemical cell of claim 1, wherein the ionically conductive medium is an alkaline electrolyte.

9. The hybrid electrochemical cell of claim 1, further comprising a separator situated between two adjacent electrodes within a common ionically conductive medium.

10. The hybrid electrochemical cell of claim 1, wherein the ionically conductive medium is a common electrolyte to both the first and second sub-cells, thereby communicating the first and second pair of electrodes.

11. The hybrid electrochemical cell of claim 10, wherein each sub-cell housing is mechanically fastened to an adjacent sub-cell housing so as to facilitate sub-cell replacement among a system of electrical switches connecting sub-cells to the controller.

12. The hybrid electrochemical cell of claim 1, wherein each sub-cell comprises a distinct ionically conductive medium such that each pair of electrodes is provided in a separate reservoir of electrolyte defined by a housing.

13. The hybrid electrochemical cell of claim 1, wherein the first electrochemical sub-cell comprises a metal electrode comprising a series of permeable electrode bodies arranged in spaced apart relation from each other.

14. The hybrid electrochemical cell of claim 1, wherein the first electrochemical sub-cell further comprises a charging electrode, wherein the charging electrode is selected from the group consisting of (a) an air electrode and (b) a third electrode spaced from a metal electrode and an air electrode.

15. The hybrid electrochemical cell of claim 14, wherein the charging electrode of the first electrochemical sub-cell generates convective flow within the ionically conductive medium while the second electrochemical sub-cell is in a discharge mode.

16. The hybrid electrochemical cell of claim 1 operatively connected in series to another hybrid electrochemical cell and to a cell-level power converter for discharge and charge operations of the module.

17. The hybrid electrochemical cell of claim 16, wherein the cell-level power converter is a voltage regulator or a current regulator maintaining a constant output from at least one of the hybrid electrochemical cells, thereby regulating different outputs from electrochemical sub-cells in a discharge mode.

18. The hybrid electrochemical cell of claim 16, wherein the cell-level power converter selectively maintains the electrical energy output based on at least one input parameter.

19. The hybrid electrochemical cell of claim 18, wherein the cell-level power converter is operatively connected to a sensor that senses a condition of the hybrid electrochemical cell and wherein the at least one input parameter is the condition sensed by the sensor.

20. The hybrid electrochemical cell of claim 18, wherein the input parameter is selected from the group of: a voltage measurement, a current measurement, an impedance measurement, a temperature, a user command or a combination thereof.

21. The hybrid electrochemical cell according to claim 1, further comprising a distinct third electrode spaced from the first metal electrode and the air electrode that is configured to reduce oxygen when first electrochemical sub-cell is in the discharge mode and evolve oxygen when the first electrochemical sub-cell is in the charge mode.

22. A hybrid electrochemical cell comprising:
i. a first pair of electrodes forming a first electrochemical sub-cell, wherein the first electrochemical sub-cell comprises a first metal electrode and an air electrode such that the first electrochemical sub-cell is characterized as a metal-air battery chemistry;
ii. a second pair of electrodes forming a second electrochemical sub-cell, wherein the second electrochemical sub-cell comprises a second metal electrode with the same type of metal in the first electrochemical sub-cell, the second metal electrode being distinct from the first metal electrode, and wherein the second electrochemical sub-cell is characterized as a different battery chemistry than the first electrochemical sub-cell;
iii. at least one ionically conductive medium communicating each pair of electrodes;
iv. a controller coupled to each pair of electrodes;
wherein the controller is configured to selectively generate an electrical current from at least one sub-cell in a discharge mode and selectively apply an electrical current to at least one sub cell in a charge mode;
wherein the controller controls the charge mode and the discharge mode based on at least one input parameter;
wherein the other electrode in the second pair of electrodes of the second electrochemical sub-cell is a metal cathode, and wherein the controller is further configured to operate the hybrid electrochemical cell in a top-off charge mode in which the metal cathode of the second electrochemical sub-cell is coupled to the air electrode of the first electrochemical sub-cell, to oxidize metal of the metal cathode.

23. A hybrid electrochemical cell comprising:
i. a first pair of electrodes forming a first electrochemical sub-cell, wherein the first electrochemical sub-cell comprises a first metal electrode and an air electrode such that the first electrochemical sub-cell is characterized as a metal-air battery chemistry;
ii. a second pair of electrodes forming a second electrochemical sub-cell, wherein the second electrochemical sub-cell comprises a second metal electrode with the same type of metal in the first electrochemical sub-cell, the second metal electrode being distinct from the first metal electrode, and wherein the second electrochemical sub-cell is characterized as a different battery chemistry than the first electrochemical sub-cell;
iii. at least one ionically conductive medium communicating each pair of electrodes;
iv. a controller coupled to each pair of electrodes;
wherein the controller is configured to selectively generate an electrical current from at least one sub-cell in a discharge mode and selectively apply an electrical current to at least one sub cell in a charge mode;
wherein the controller controls the charge mode and the discharge mode based on at least one input parameter; and
wherein the controller is further configured to operate the hybrid electrochemical cell in a high power parallel discharge mode wherein the first electrochemical sub-cell and the second electrochemical sub-cell are connected in parallel and both in a discharge mode.

24. A method of operating a hybrid electrochemical cell, the hybrid electrochemical cell comprising: (i) a first pair of electrodes forming a first electrochemical sub-cell, wherein the first electrochemical sub-cell comprises a first metal electrode and an air electrode such that the first electrochemical sub-cell is characterized as a metal-air battery chemistry, (ii) a second pair of electrodes forming a second electrochemical sub-cell, wherein the second electrochemical sub-cell comprises a second metal electrode with the same type of metal in the first electrochemical sub-cell, the second metal electrode being distinct from the first metal electrode, and wherein the second electrochemical sub-cell is characterized as a different battery chemistry than the first electrochemical sub-cell, (iii) at least one ionically conductive medium communicating each pair of electrodes, (iv) a controller coupled to each pair of electrodes; and (v) a plurality of switches, each switch being operatively coupled between the controller and one of the terminals associated with each of the electrodes, wherein the method comprises:
  selectively generating an electrical current from at least one sub-cell in a discharge mode and
  selectively apply an electrical current to at least one sub cell in a charge mode,
  wherein the controller controls the charge mode and the discharge mode based on at least one input parameter, wherein the controller is configured to control an open state and a closed state for each of the plurality of switches, and wherein said controller is configured to select between operating modes, the operating modes comprising:
  i. high energy discharge mode wherein the first electrochemical sub-cell is in a discharge mode and the second electrochemical sub-cell is in an idle;
  ii. high power discharge mode wherein the second electrochemical sub-cell is in a discharge mode and the first electrochemical sub-cell is in an idle mode;
  iii. high power parallel discharge mode wherein the first electrochemical sub-cell and second electrochemical sub-cell are connected in parallel and the first electrochemical sub-cell is in a discharge mode and the second electrochemical sub-cell is in a discharge mode; and
  iv. maintenance mode wherein at least one sub-cell is in a 'deep discharge' mode, reset mode, or top-off charge mode.

25. The method of claim 24, wherein the controller is operatively connected to a sensor that is configured to sense the at least one input parameter, and wherein the method comprises sensing the at least one input parameter using the sensor.

26. The method of claim 24, wherein the first electrochemical sub-cell further comprises a charging electrode, and wherein the charging electrode is selected from the group consisting of (a) an air electrode and (b) a third electrode spaced from a metal electrode and an air electrode, and wherein the method further comprises controlling via the controller the charging electrode of the first electrochemical sub-cell to generate convective flow within the ionically conductive medium while the second electrochemical sub-cell is in a discharge mode.

27. The method of claim 24, wherein the hybrid electrochemical cell is operatively connected in series to another hybrid electrochemical cell and to a cell-level power converter for discharge and charge operations of the module, and wherein the method further comprises maintaining a constant output from at least one of the hybrid electrochemical cells using the cell-level power converter, thereby regulating different outputs from electrochemical sub-cells in a discharge mode.

28. The method of claim 27, wherein the cell-level power converter is a voltage regulator or a current regulator.

29. The method of claim 28, wherein the cell-level power converter is operatively connected to a sensor that senses a condition of the hybrid electrochemical cell and wherein the at least one input parameter is the condition sensed by the sensor.

30. The method of claim 28, wherein the input parameter is selected from the group of: a voltage measurement, a current measurement, an impedance measurement, a temperature, a user command or a combination thereof.

31. The method of claim 27, wherein the method further comprises selectively maintaining the electrical energy output using cell-level power converter based on at least one input parameter.

32. The method of claim 24, wherein the hybrid electrochemical cell further comprises a distinct third electrode spaced from the first metal electrode and the air electrode, and wherein the method further comprises: reducing oxygen using the third electrode when first electrochemical sub-cell is in the discharge mode and evolving oxygen using the third electrode when the first electrochemical sub-cell is in the charge mode.

33. A method of operating a hybrid electrochemical cell, the hybrid electrochemical cell comprising: (i) a first pair of electrodes forming a first electrochemical sub-cell, wherein the first electrochemical sub-cell comprises a first metal electrode and an air electrode such that the first electrochemical sub-cell is characterized as a metal-air battery chemistry, (ii) a second pair of electrodes forming a second electrochemical sub-cell, wherein the second electrochemical sub-cell comprises a second metal electrode with the same type of metal in the first electrochemical sub-cell, the second metal electrode being distinct from the first metal electrode, and wherein the second electrochemical sub-cell is characterized as a different battery chemistry than the first electrochemical sub-cell, (iii) at least one ionically conductive medium communicating each pair of electrodes, and (iv) a controller coupled to each pair of electrodes: wherein the method comprises:
  selectively generating an electrical current from at least one sub-cell in a discharge mode and
  selectively apply an electrical current to at least one sub cell in a charge mode,
  wherein the controller controls the charge mode and the discharge mode based on at least one input parameter, wherein the other electrode in the second pair of electrodes of the second electrochemical sub-cell is a metal cathode, and wherein the controller is further configured to operate the hybrid electrochemical cell in a top-off charge mode in which the metal cathode of the second electrochemical sub-cell is coupled to the air electrode of the first electrochemical sub-cell, to oxidize metal of the metal cathode.

34. A method of operating a hybrid electrochemical cell, the hybrid electrochemical cell comprising: (i) a first pair of electrodes forming a first electrochemical sub-cell, wherein the first electrochemical sub-cell comprises a first metal electrode and an air electrode such that the first electrochemical sub-cell is characterized as a metal-air battery chemistry, (ii) a second pair of electrodes forming a second electrochemical sub-cell, wherein the second electrochemical sub-cell comprises a second metal electrode with the same type of metal in the first electrochemical sub-cell, the second metal electrode being distinct from the first metal electrode, and wherein the second electrochemical sub-cell is characterized as a different battery chemistry than the first electrochemical sub-cell, (iii) at least one ionically conductive medium communicating each pair of electrodes, and (iv) a controller coupled to each pair of electrodes; wherein the method comprises:
  selectively generating an electrical current from at least one sub-cell in a discharge mode and
  selectively apply an electrical current to at least one sub cell in a charge mode,
  wherein the controller controls the charge mode and the discharge mode based on at least one input parameter, and wherein the controller is further configured to operate the hybrid electrochemical cell in a high power parallel discharge mode wherein the first electrochemical sub-cell and the second electrochemical sub-cell are connected in parallel and both in a discharge mode.

* * * * *